(12) United States Patent
Kwon et al.

(10) Patent No.: US 12,705,199 B2
(45) Date of Patent: Aug. 11, 2026

(54) PORT-BASED ROUTING (PBR) SWITCHES, COMPUTE EXPRESS LINK (CXL) FABRIC, AND CXL SWITCH TO MANAGE CACHE COHERENCY BETWEEN HOST SERVERS

(71) Applicant: Panmnesia Inc., Daejeon (KR)

(72) Inventors: Mi Ryeong Kwon, Daejeon (KR); Sang Won Lee, Daejeon (KR)

(73) Assignee: Panmnesia Inc., Daejeon (KR)

( * ) Notice: Subject to any disclaimer, the term of this patent is extended or adjusted under 35 U.S.C. 154(b) by 0 days.

(21) Appl. No.: 18/386,622

(22) Filed: Nov. 3, 2023

(65) Prior Publication Data

US 2024/0378161 A1 Nov. 14, 2024

(30) Foreign Application Priority Data

May 8, 2023 (KR) ........................ 10-2023-0058938

(51) Int. Cl.
*G06F 13/40* (2006.01)

(52) U.S. Cl.
CPC ................................ *G06F 13/4022* (2013.01)

(58) Field of Classification Search
None
See application file for complete search history.

(56) References Cited

U.S. PATENT DOCUMENTS

2020/0125503 A1 4/2020 Graniello et al.
2023/0017643 A1 1/2023 Shah et al.
2024/0012684 A1 * 1/2024 Jung ..................... G06F 9/5016

FOREIGN PATENT DOCUMENTS

KR 20210147865 A 12/2021

OTHER PUBLICATIONS

Ming Liu. Jun. 22, 2023. Fabric-Centric Computing. In Proceedings of the 19th Workshop on Hot Topics in Operating Systems (HOTOS '23). Association for Computing Machinery, New York, NY, USA, 118-126. https://doi.org/10.1145/3593856.3595907 (Year: 2023).*
D. D. Sharma, "Invited: Compute Express Link™ (CXL™): An Open Interconnect for Cloud Infrastructure," 2023 60th ACM/IEEE Design Automation Conference (DAC), San Francisco, CA, USA, Sep. 15, 2023, pp. 1-4, doi: 10.1109/DAC56929.2023.10247726. (Year: 2023).*

* cited by examiner

*Primary Examiner* — Farley Abad
*Assistant Examiner* — Dayton Lewis-Taylor
(74) *Attorney, Agent, or Firm* — KDW Firm PLLC

(57) ABSTRACT

A compute express link (CXL) fabric configured to connect a plurality of host servers and a plurality of devices to form a CXL network includes: one or more port-based routing (PBR) switches configured to connect the host servers, the devices, or other PBR switches to implement the CXL network; and a fabric manager configured to collectively manage the one or more PBR switches.

17 Claims, 40 Drawing Sheets

| Item No. | Counterpart connected to PBR switch | | Port of PBR switch | |
|---|---|---|---|---|
| | Direction of port | Type of port | Direction of port | Type of port to be set |
| 1 | Downstream | PCIe host | Upstream | Edge USP – PCIe only |
| 2 | Downstream | CXL 1.1 host (RCH) | Upstream | Edge USP – CXL HBR |
| 3 | Downstream | CXL 2.0 or higher host (VH-capable) | Upstream | Edge USP – CXL HBR |
| 4 | Downstream | DSP of PCIe switch | Upstream | Edge USP – PCIe only |
| 5 | Downstream | DSP of HBR switch | Upstream | Edge USP – PCIe only |
| 6 | Downstream | DSP of PBR switch | Upstream | Fabric Port |
| 7 | Upstream | PCIe device (Endpoint) | Downstream | Edge DSP – PCIe only |
| 8 | Upstream | CXL 1.1 device (RCD) | Downstream | Edge DSP – CXL HBR |
| 9 | Upstream | CXL 2.0 or higher device (VH-capable) | Downstream | Edge DSP – CXL HBR |
| 10 | Upstream | CXL 3.0 GFD | Downstream | Edge DSP – CXL PBR |
| 11 | Upstream | USP of PCIe switch | Downstream | Edge DSP – PCIe only |
| 12 | Upstream | USP of HBR switch | Downstream | Edge DSP – CXL HBR |
| 13 | Upstream | USP of PBR switch | Downstream | Fabric Port |

FIG. 7A

| Type of counterpart port | Modified TS1/TS2 Ordered Set | | | PCI Config Space | Unidentifiable? | |
|---|---|---|---|---|---|---|
| | PCIe only | CXL VH supported | PBR supported | PCI Header Type | | |
| PCIe host | Yes | No | No | USP is not allowed to access Config Space of DSP. | | |
| CXL 1.1 host (RCH) | No | No | No | | | |
| CXL 2.0 or higher host (VH-capable) | No | Yes | No | | | |
| DSP of PCIe switch | Yes | No | No | | | |
| DSP of HBR switch | No | Yes | No | | | |
| DSP of PBR switch | No | Yes | Yes | | | |
| PCIe device (Endpoint) | Yes | No | No | Type 0 | | |
| CXL 1.1 device (RCD) | No | No | No | Type 0 | | |
| CXL 2.0 or higher device (VH-capable) | No | Yes | No | Type 0 | | |
| CXL 3.0 GFD | No | Yes | Yes | - | | |
| USP of PCIe switch | Yes | No | No | Type 1 | | |
| USP of HBR switch | No | Yes | No | Type 1 | | |
| USP of PBR switch | No | Yes | Yes | - | | |

| Symbol Number | Description | |
|---|---|---|
| 0~7 | See CXL 3.0 Specification Section 6.4.1.1 | |
| 8~9 | Bit[2:0] | Usage (See CXL 3.0 Specification Section 6.4.1.1) |
| | Bit[4:3] | Alternate Protocol Negotiation Status (See CXL 3.0 Specification Section 6.4.1.1) |
| | Bit[7:5] | Alternate Protocol ID (See CXL 3.0 Specification Section 6.4.1.1) |
| | Bit[8] | Common Clock (See CXL 3.0 Specification Section 6.4.1.1) |
| | Bit[9] | 1 if transmitter is Upstream Port of CXL HBR switch |
| | Bit[15:10] | Reserved (See CXL 3.0 Specification Section 6.4.1.1) |
| 10~15 | See CXL 3.0 Specification Section 6.4.1.1 | |

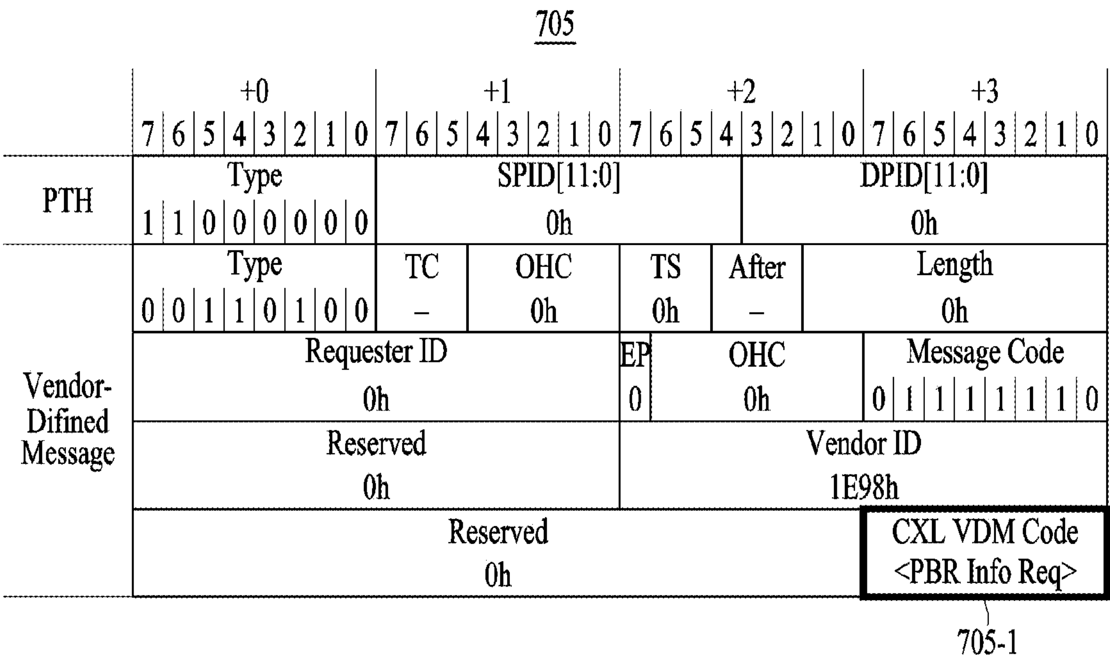

705

| Section | Field | Field | Field | Field | Field | Field |
|---|---|---|---|---|---|---|
| PTH | Type 1 1 0 0 0 0 0 0 | SPID[11:0] 0h | DPID[11:0] 0h | | | |
| Vendor-Difined Message | Type 0 0 1 1 0 1 0 0 | TC – | OHC 0h | TS 0h | After – | Length 0h |
| | Requester ID 0h | EP 0 | OHC 0h | Message Code 0 1 1 1 1 1 1 0 | | |
| | Reserved 0h | Vendor ID 1E98h | | | | |
| | Reserved 0h | CXL VDM Code <PBR Info Req> | | | | |

705-1

706

| Section | Field | Field | Field | Field | Field | Field |
|---|---|---|---|---|---|---|
| PTH | Type 1 1 0 0 0 0 0 0 | SPID[11:0] 0h | DPID[11:0] 0h | | | |
| Vendor-Difined Message | Type 0 1 1 1 0 1 0 0 | TC – | OHC 0h | TS 0h | After – | Length 0 0 0 0 0 0 0 0 0 1 |
| | Requester ID 0h | EP 0 | Reserved 0h | Message Code 0 1 1 1 1 1 1 0 | | |
| | Reserved 0h | Vendor ID 1E98h | | | | |
| | Reserved 0h | CXL VDM Code <PBR Info Resp> | | | | |
| | Serial Number [31:0] <Serial Number> | | | | | |
| | Serial Number [63:32] <Serial Number> | | | | | |

| Byte Offset | Byte Length | Description |
|---|---|---|
| 0 | 8 | Unique number of PBR switch transmitting current message |
| 8 | 1 | Total number of ports present in PBR switch |
| 9+n*10 | 1 | Port number |
| 9+n*10+1 | 1 | Port state and type of connected counterpart port<br>Bit [0]: Direction of current port (0: USP, 1: DSP)<br>Bit [1]: Protocol used for connection (0: PCIe, 1: CXL)<br>Bit [2]: CXL VH-capable (0: RCD/RCH, 1: CXL 2.0 or above)<br>Bit [3]: MLD mode<br>Bit [5:4]: Flit Type<br>00: 68B Flit<br>01: 256B Flit<br>10: 256B Latency Optimized Flit<br>11: PBR Flit<br>Bit [6]: Type of counterpart port (0: Endpoint / Root Port, 1: Switch)<br>Bit [7]: Reserved |
| 9+n*10+2 | 8 | Serial number of switch connected to port |

FIG. 7F

Line:

```
edge_port_list = []
sn_to_index_map = {}
adj[][] = [nil, ]

for neighbor_list in received_information_list:
 sn_to_index_map[neighbor_list.sn] = len(sn_to_index_map)

 for port in neighbor_list.port_list:
  if not port.connected_to_pbr_switch():
    port.pbr_id = len(edge_port_list)
    edge_port_list.append((neighbor_list.sn, port.number))

if len(edge_port_list) > 4096:
 return False

for neighbor_list in received_information_list:
 src_sn = neighbor_list.sn
 src_idx = sn_to_index_map[src_sn]

 for port in neighbor_list.port_list:
  if port.connected_to_pbr_switch():
    dst_sn = port.sn
    dst_idx = sn_to_index_map[dst_sn]

    adj[src_idx][dst_idx] = port.number

return True
```

FIG. 7G

<Definition 2,4>

$S_{0,3}=\{S_0, S_1, S_2\}$ $S_{1,3}=\{S_3, S_1, S_2\}$ $S_{2,3}=\{S_6, S_4, S_2\}$

<Definition 5>

$|p_{3,3}|=\overline{S_3,D_3}=2$ $|p_{2,3}|=\overline{S_2,D_3}=0$

<Definition 6>

$S_3=\{S_1, D_2\}$

<Definition 7>

$s_0=\{S_2\}$ $s_1=\{S_1\}$

<Definition 8>

Cache line (S1) = Number of cache lines ($H_0$) + Number of cache lines ($H_1$)

Cache line (S2) = Number of cache lines (S1) + Number of cache lines ($H_2$)

∴ Number of cache lines (S1) < Number of cache lines (S2)

```
Line:
result = []

switch_set_x_y.sort() // Sort by distance between switch and device_y
src_edge_port = edge_port_list[x]
dst_edge_port = edge_port_list[y]

for sidx, switch in enumerate(switch_set_x_y):
  my_idx = sn_to_idx_map[switch.sn]

  if switch.sn == src_edge_port[0]:
    src_port = src_edge_port[1]
  else:
    src_switch = switch_set_x_y[sidx - 1]
    src_idx = sn_to_idx_map[src_switch.sn]
    src_port = adj[my_idx][src_idx]

  if switch.sn == dst_edge_port[0]:
    dst_port = dst_edge_port[1]
  else:
    dst_switch = switch_set_x_y[sidx + 1]
    dst_idx = sn_to_idx_map[dst_switch.sn]
    dst_port = adj[my_idx][dst_idx]

  result.append((switch.sn, src_port, dst_port))
```

FIG. 8B

| Byte Offset | Byte Length | Description |
| --- | --- | --- |
| 0 | 2 | Number of routing information |
| 2+n*3 | 1 | Port number of PBR switch |
| 2+n*3+1 | 2 | PBR ID value to be added to/deleted from routing table<br>- Transmit information as to whether add/delete to Opcode of message (not indicated in table)<br>- For addition, when DPID value of PBR message is value written in this field, transmit it to corresponding port number<br>- For deletion, exclude value written in this field from list of DPID values transmitted through corresponding port |

| Byte size | Information |
|---|---|
| Maximum 4KB | PCI Config Space of port |
| Maximum 64KB | BAR space in which CXL register of port is to be stored |
| 2 (12bit) | PBR ID of Edge USP |
| 1 (4bit) | When device connected to Edge DSP is MLD, LD-ID used by Edge USP |
| 1 | Number (n) of DSPs in virtual switch |
| 2 (12bit)*n | PBR ID of Edge DSP |

FIG. 9B

| | Items | Port | Storage position | |
|---|---|---|---|---|
| | PBR ID of Edge USP | Edge USP | Edge port controller | 740A |
| 900A | PCI (Prefetchable) Memory Window → DSP number | | Storage module | 730A |
| 901A | PCI Bus Window → DSP number | | Storage module | 730A |
| | CacheID Routing Table | | Edge port controller | 740A |
| | HDM Decoder | | Edge port controller | 740A |
| 902A | DSP number → PBR ID of Edge DSP | | Storage module | 730A |
| 903B | PBR ID of Edge DSP → CacheID | | Storage module | 730A |
| 904B | PBR ID of Edge DSP → BI-ID | | Storage module | 730A |
| | PBR ID of Edge USP | Edge DSP | Edge port controller | 740B |
| | PCI (Prefetchable) Memory Window | | Edge port controller | 740B |
| | PCI Bus Window | | Edge port controller | 740B |
| | PBR ID of Edge DSP → LD-ID | | Edge port controller | 740B |
| 905 | HDM Decoder | | Storage module | 730B |
| 902B | DSP number → PBR ID of Edge DSP | | Storage module | 730B |
| 900B | PCI (Prefetchable) Memory Window → DSP number | | Storage module | 730B |
| 901B | PCI Bus Window → DSP number | | Storage module | 730B |

FIG. 10A

| Byte Offset | Byte Length | Description |
|---|---|---|
| 0 | 8 | Unique number of PBR switch |
| 8 | 1 | Port number to be applied |
| 1 | 1 | Number of information to be transmitted |
| 10+n*k+0 | 1 | Information type<br>0: Set PBR ID of current port<br>1: Add another port belonging to the same virtual switch as current port<br>This includes port number of virtual switch, PBR ID, USP/DSP, LD-ID.<br>2: Remove another port belonging to the same virtual switch as current port<br>3: PCI memory window information of another port<br>4: PCI prefetchable memory window information of another port<br>5: PCI bus window information of another port<br>6: Cache ID routing table of another port<br>7: HDM decoder information of another port<br>8-255: Reserved |
| 10+n*k+1 | 2 | PBR ID of another port (for current port information, PBR ID of current port) |
| 10+n*k+3 | K (variable) | Vary according to data of information to be transmitted and type of information |

FIG. 10I

| Message of HDM-D | | Type of port | Direction | Message of HDM-DB | |
|---|---|---|---|---|---|
| Channel | Message | | | Message | Channel |
| H2D Req | All | Protocol conversion device 820 does not store data of host memory, and responds to all snoop requests transmitted from host as Invalid (RspIHitI). | – | | |
| D2H Resp | RspIHitI | | | | |
| | Others | | | | |
| D2H Data | All | | | | |
| D2H Req | RdCurr | Converts BISnp to D2H Req Uses BITag value of S2M BIReq for CQID | ← | BISnpCur(Blk) | S2M BIReq |
| | RdShared | | | BISnpData(Blk) | |
| | RdOwn | | | BISnpInv(Blk) | |
| | Others | As function that is not in back-invalidation, not transmit to host | – | | |
| H2D Resp | All | Not used. Host responds to D2H Req of HDM-D area as M2S Req. | – | | |
| H2D Data | All | | | | |
| M2S Req | MemRdFwd | Response to D2H Req. Converts to BIRsp Uses Tag(CQID) value of M2S Req for BITag | → | BIRspI/S/E(Blk) | M2S BIRsp |
| | MemWrFwd | Not used. | – | | |
| | Others | Operation performed by host to raise cache authorization | → | Transmit without change | M2S Req |
| M2S RwD | MemWr(Ptl) | Operation performed by host to lower cache authorization | → | Transmit without change | M2S RwD |
| M2S Req | MemClnEvct | HDM-DB only message. Not transmitted to protocol conversion device 820 | – | | |
| M2S RwD | BIConflict | | | | |
| S2M NDR | BIConflict-Ack | Not used. (HDM-DB only) | – | | |
| | Others | Response to request transmitted from host | ← | Transmit without change | S2M NDR |
| S2M DRS | All | Response to request transmitted from host | ← | Transmit without change | S2M DRS |

PORT-BASED ROUTING (PBR) SWITCHES, COMPUTE EXPRESS LINK (CXL) FABRIC, AND CXL SWITCH TO MANAGE CACHE COHERENCY BETWEEN HOST SERVERS

CROSS-REFERENCE TO RELATED APPLICATIONS

This application claims priority under 35 USC § 119(a) to Korean Patent Application No. 10-2023-0058938 filed on May 8, 2023, in the Korean Intellectual Property Office, the disclosure of which is incorporated by reference herein in its entirety.

BACKGROUND

1. Field

The following description relates to port-based routing (PBR) switches, a computer express link (CXL) fabric, and a CXL switch for managing cache coherency between host servers.

2. Description of Related Art

To process massive data, a high-performance computing (HPC) system may divide and store data according to multiple computing nodes, exchange resulting values obtained by processing the stored data by dividing them, and calculate a final result. However, as the number of nodes participating in the computation increases, the amount of time used for the data exchange may increase and high-capacity memory may thus be required. In this case, implementing the high-capacity memory may require a network that ensures cache coherency.

In the past, commercialized cache-coherent networks belonged to specific vendors, and it may thus be impossible to connect products from other vendors. To address this issue, there have been attempts to establish open standards. As a representative example of the attempts, there was a Gen-Z consortium, which was less activated with no participation of Intel and has since been merged into the computer express link (CXL) interconnect. Although the CXL was established to provide cache coherency within a single computer (e.g., cache coherency between host servers and devices), functions that implement it in the CXL 3.0 protocol have been added by the demand for cache-coherent distributed shared memory (DSM).

SUMMARY in This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a compute express link (CXL) that connects a plurality of host servers and a plurality of devices to form a single CXL network, the CXL fabric includes: at least one port-based routing (PBR) switch configured to connect a host server, a device, and another PBR switch to implement the CXL network; and a fabric manager configured to collectively manage the at least one PBR switch.

The at least one PBR switch may include: a routing table configured to store routing information associated with a routing path in the CXL network: two or more ports configured to function as an upstream port, a downstream port, or a fabric port: a crossbar switch configured to set a connection path (crossbar) between the two or more ports based on the routing information; and a controller configured to perform monitoring and setting changes on the routing table, the two or more ports, and the crossbar switch.

The at least one PBR switch may be configured to: identify types of neighboring ports connected to each port, collect information about the neighboring ports, and transmit the collected information to the fabric manager. The fabric manager may be configured to: determine a topology of the CXL network based on the collected information.

The at least one PBR switch may be configured to: discriminate a port of a CXL 2.0 host and a downstream port of a hierarchy-based routing (HBR) switch, based on modified TS (training sequence) 1/TS2 ordered sets transmitted and received in a peripheral component interconnect-express (PCIe) link-based alternate protocol negotiation (APN) process with a neighboring port.

The at least one PBR switch may be configured to: discriminate a port of a PBR switch and a port of a global fabric attached memory (G-FAM) device (GFD) based on a vendor-defined message (VDM) exchange with a neighboring port.

The fabric manager may be configured to: assign PBR identifiers (IDs) for PBR flit routing to the upstream port and the downstream port of the PBR switch, respectively; and generate connectivity between PBR switches to determine the topology of the CXL network.

The connectivity may be represented by an adjacency matrix that treats a PBR switch as a node and represents the connectivity between the PBR switches.

The fabric manager may be configured to: set routing paths in the CXK network in response to assignment of a system administrator between elements based on the topology of the CXL network, wherein the elements include the host server and the device; and generate routing information associated with the routing paths and transmit the generated routing information to the at least one PBR switch.

The fabric manager may be configured to: set the routing paths such that a routing path connecting a specific host server and a specific device is unique.

The at least one PBR switch may be configured to: store metadata for identifying the at least one PBR switch as at least some virtual switch in response to a device enumeration process of the host server.

The virtual switch may correspond to one host server and may be configured to directly connect the host server and at least one device assigned to the host server.

The at least one PBR switch may be configured to: perform a conversion between an HBR message and a PBR message based on prestored metadata. The conversion between the HBR message and the PBR message may be performed on ports included in the PBR switch. A port connected on a message generation side may be configured to perform a message format conversion by including a destination PBR ID (DPID) and a source PBR ID (SPID) in an incoming message into the port, and a port connected on a message end side may be configured to perform a message format conversion by excluding the DPID and the SPID from an incoming message into the port.

The SPID may include a PBR ID of the port connected on the message generation side or an ID value included in the incoming message, and the DPID may include a PBR ID of the port connected on the message end side.

In another general aspect, a PBR switch includes: a routing table configured to store routing information associated with routing paths in a CXL network: two or more ports configured to function as an upstream port, a downstream port, or a fabric port: a crossbar switch configured to set a connection path (crossbar) between the two or more ports based on the routing information; and a controller configured to perform monitoring and setting changes on the routing table, the two or more ports, and the crossbar switch.

Each of the two or more ports may include: a multiplexer configured to determine a transmission path within a port for an incoming message into the port: a format conversion module configured to convert a format of the message; and an edge port controller configured to perform initialization and setting on an edge port.

Each of the two or more ports may be configured to: transmit only a PBR message to the crossbar switch regardless of a format of an incoming message into a port.

In another general aspect, a CXL switch includes: a port: a snoop filter connected to the port and configured to perform cache coherency management between host servers sharing a specific device; and a static random-access memory (SRAM) configured to store states and owner information of cache line data used by the snoop filter for the cache coherency management.

The size of the owner information may be calculated based on the number of ports, not on the number of host servers.

In response to the CXL switch being a PBR switch, the size of the owner information may be calculated based on the number of all ports included in the PBR switch. In response to the CXL switch being an HBR switch, the size of the owner information may be calculated based on the number of upstream ports included in the HBR switch.

The snoop filter may be configured to: perform the cache coherency management between the host servers, based on a SPID, a DPID, or a logical device ID (LD-ID) included in a message reaching itself.

A set of CXL switches may constitute a back-invalidation-based cache-coherent network. In this case, only CXL switches that do not have the same port used when transmitting a snoop request to a host server among the host servers may participate in the cache coherency management between the host servers.

The number of cache line data stored in the SRAM may be calculated based on the number of host servers for which the CXL switch manages cache coherency and a total sum of remaining capacities of all SRAMs included in the network.

Of the port, the upstream port may include a protocol conversion module configured to perform a protocol conversion based on a mapping table between a host-managed device memory-D (HDM-D) and a host-managed device memory-DB (HDM-DB), for cache coherency management of host servers that do not support a back-invalidation operation.

Other features and aspects will be apparent from the following detailed description, the drawings, and the claims.

BRIEF DESCRIPTION OF THE DRAWINGS

FIGS. 7A through 7G are diagrams illustrating a topology determination operation of a CXL network according to an embodiment.

FIGS. 8A through 8C are diagrams illustrating a routing path setting operation according to an embodiment.

FIGS. 9A and 9B are diagrams illustrating a device enumeration operation according to an embodiment.

FIGS. 10A through 10K are diagrams illustrating a message format conversion operation according to an embodiment.

FIGS. 11A through 11I are diagrams illustrating a structure and an operation of a CXL switch configured to perform cache coherency management according to an embodiment.

Figure 1:
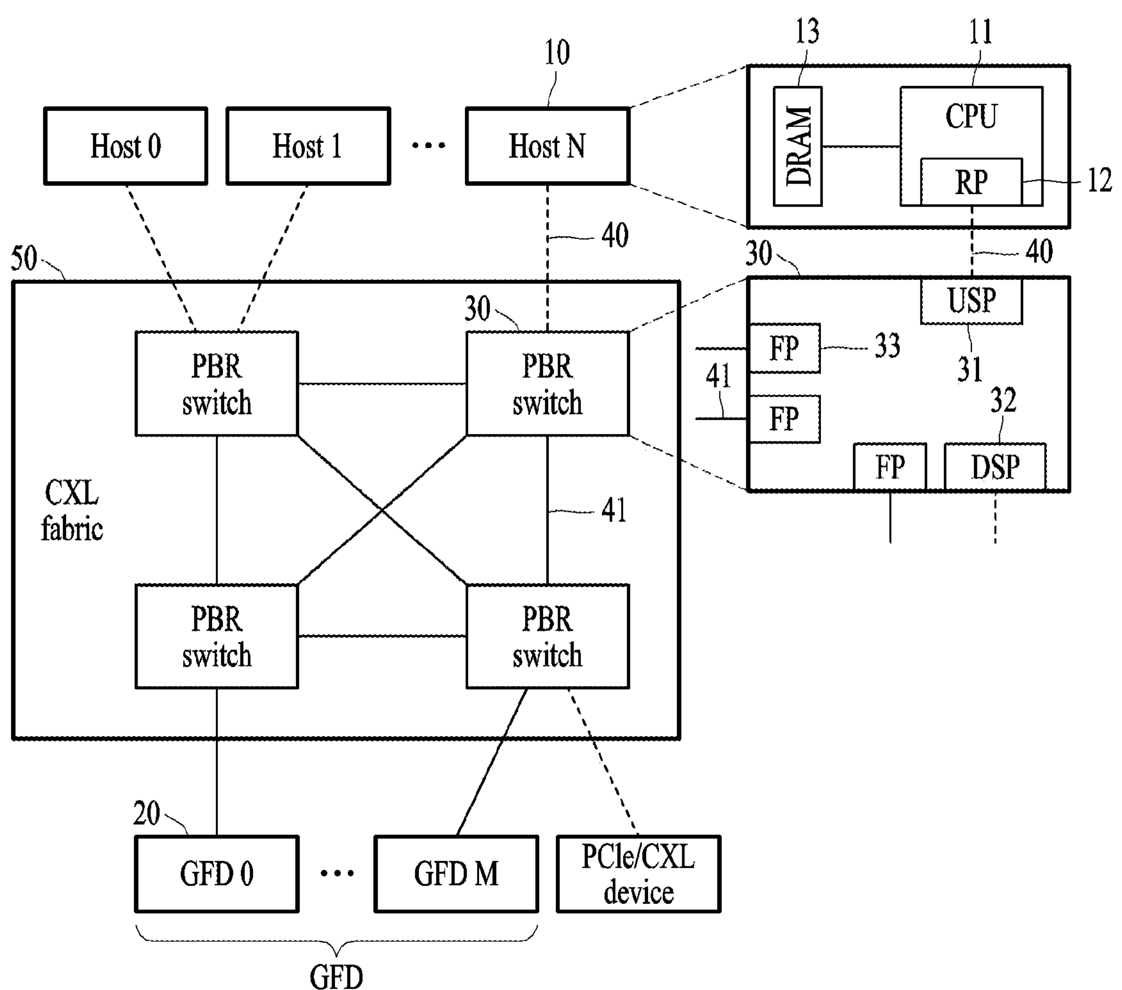
FIG. 1 is a diagram illustrating a computer express link (CXL) fabric proposed in the CXL 3.0 protocol.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed structural or functional description is provided to present examples only, and various alterations and modifications may be made to example embodiments. Here, examples are not construed as limited to the specific example embodiments of the present disclosure and should be understood to include all changes, equivalents, and replacements within the idea and technical scope of the disclosure.

Although terms such as first, second, and the like are used to describe various components, the components are not limited to the terms. These terms should be used only to distinguish one component from another component. For example, a first component may be referred to as a second component and similarly, the second component may also be referred to as the first component.

It should be noted that, when a component or element is described as "connected," "coupled," or "joined" to another component or element, it may be directly (e.g., in contact with the other component or element) "connected," "coupled," or "joined" to the other component or element, or there may reasonably be one or more other components or elements intervening therebetween.

The singular forms "a," "an," and "the" are intended to include the plural forms as well, unless the context clearly indicates otherwise. As used herein, the term "and/or" includes any one and any combination of any two or more of the associated listed items. As used herein, the phrases "at least one of A, B, and C," "at least one of A, B, or C," and the like are intended to have disjunctive meanings, and these phrases "at least one of A, B, and C," "at least one of A, B, or C," and the like also include examples where there may be one or more of each of A, B, and/or C (e.g., any combination of one or more of each of A, B, and C), unless the corresponding description and embodiment necessitate such listings (e.g., "at least one of A, B, and C") to be interpreted to have a conjunctive meaning. It is to be further understood that, as non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

As used in connection with the present disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in the form of an application-specific integrated circuit (ASIC).

In addition, the term "-er/or" or "unit" used herein may refer to a software or hardware component, such as a field-programmable gate array (FPGA) or an ASIC, and it performs predefined functions. However, it is not limited to software or hardware. The "er/or" or "unit" may be configured to reside on an addressable storage medium or configured to operate one or more processors. Accordingly, it may include, for example, components, such as software components, object-oriented software components, class components, and task components, processes, functions, attributes, procedures, sub-routines, segments of program code, drivers, firmware, microcode, circuitry, data, databases (DBs), data structures, tables, arrays, and variables. The functionalities provided in the components and units may be combined into fewer components and units or may be further separated into additional components and units. Furthermore, the components and units may be implemented to operate on one or more central processing units (CPUs) within a device or a security multimedia card. In addition, the "er/or" or "unit" may include one or more processors.

Hereinafter, example embodiments will be described in detail with reference to the accompanying drawings. When describing the embodiments with reference to the accompanying drawings, like reference numerals refer to like components and a repeated description related thereto will be omitted.

FIG. 1 is a diagram illustrating a computer express link (CXL) fabric proposed in the CXL 3.0 protocol.

A CXL fabric 50 may be provided to form a single CXL network by connecting a plurality of host servers (e.g., 10) (hereinafter also referred to as hosts) and a plurality of devices (e.g., global fabric attached memory (G-FAM) devices (GFDs) 20, peripheral component interconnect express (PCIe) devices, CXL devices, and hierarchy-based routing (HBR) switches). The CXL fabric 50 may be configured using at least one port-based routing (PBR) switch (e.g., 30) (e.g., a PBR switch proposed in the CXL 3.0 protocol). The PBR switch 30 may be connected to another PBR switch via a CXL interconnect 41 that uses a PBR flit (e.g., a packet including one or more messages) as a unit of transmission.

A host 10 (e.g., a host connected to the CXL fabric 50) may include therein a central processing unit (CPU) 11 that supports the CXL 3.0 protocol and a back-invalidation operation. The CPU 11 may access a cache-coherent distributed shared memory (DSM) (e.g., a GFD 20) through PBR switches (e.g., 30) included in the CXL fabric 50. For the CPU 11 to be connected to the PBR switch 30, a root port (RP) 12 that supports back-invalidation may be required. The CXL RP 12 and the PBR switch 30 may be connected via a CXL interconnect 40 using an HBR flit (e.g., a method of routing messages from an HBR switch defined in the CXL 2.0 protocol).

The PBR switch 30 may include two or more ports. Each port may be classified as an upstream port (USP) 31, a downstream port (DSP) 32, or a fabric port (FP) 33 depending on a device (and/or switch) to be connected. The USP 31 may be connected to the host 10 and may be based on the CXL interconnect 40 using the HBR flit. The DSP 32 may be connected to a PCIe input/output (I/O) device (e.g., a non-volatile memory express (NVMe) a solid-state drive (SSD), and a graphics processing unit (GPU)) or a CXL device (e.g., a CXL Type 3 device), and may be based on the CXL interconnect 40 using the HBR flit. The FP 33 may be connected only to the PBR switch 30 and may be based on the CXL interconnect 41 using the PBR flit. The GFD 20 may be connected to the DSP 32 and use the PBR flit rather than the HBR flit.

The USP 31 and the DSP 32 of the PBR switch 30 may be located at a boundary of the CXL fabric 50, and they may thus be referred to as an edge USP and an edge DSP, respectively. The edge USP and the edge DSP may be collectively referred to as an edge port, and each edge port may have a PBR identifier (ID) that is a unique number assigned for routing the PBR flit.

However, the CXL 3.0 protocol does not fully describe the structure and operations of a newly defined CXL fabric 50 and a newly defined PBR switch 30. Therefore, for a complete implementation of the CXL fabric 50 and the PBR switch 30, the following additional operations may be required to be defined.

1) Network Topology Exploration Method and Routing Path Setting Method for CXL Fabric For an implementation of a CXL fabric in which all elements (e.g., hosts, devices, and switches) of a distributed computing system are all physically connected may require detailed methods of exploring a network topology and setting a routing path for the CXL fabric. Such a network topology exploration method of the CXL fabric according to an embodiment will be described in detail below with reference to FIGS. 7A to 7G, and such a routing path setting method of the CXL fabric according to an embodiment will be described in detail below with reference to FIGS. 8A to 8C.

2) Method of Enumerating Devices Connected to Host

A typical PCIe-based CXL device may enumerate and initialize devices connected to a host as defined in PCIe. However, as a CXL fabric in the CXL 3.0 protocol deviates from a PCIe structure to connect more hosts and devices into a single network than the typical CXL, a new device enumeration method may be required. The device enumeration method according to an embodiment will be described in detail below with reference to FIGS. 9A and 9B.

3) HBR-PBR Interconversion Rules

For compatibility between the CXL 2.0 protocol and the CXL 3.0 protocol, the CXL 3.0 protocol adds a new PBR method while maintaining the existing HBR. Other elements (e.g., CXL devices, host servers, and HBR switches), excluding PBR switches and GFDs, may use an HBR flit. To connect hosts and CXL devices to the CXL fabric, rules of interconversion between an HBR flit and a PBR flit that are inputted and outputted by a PBR switch may be required to be defined. The HBR-PBR interconversion rules according to an embodiment will be described in detail below with reference to FIGS. 10A to 10K.

Figures 2A, 2B:
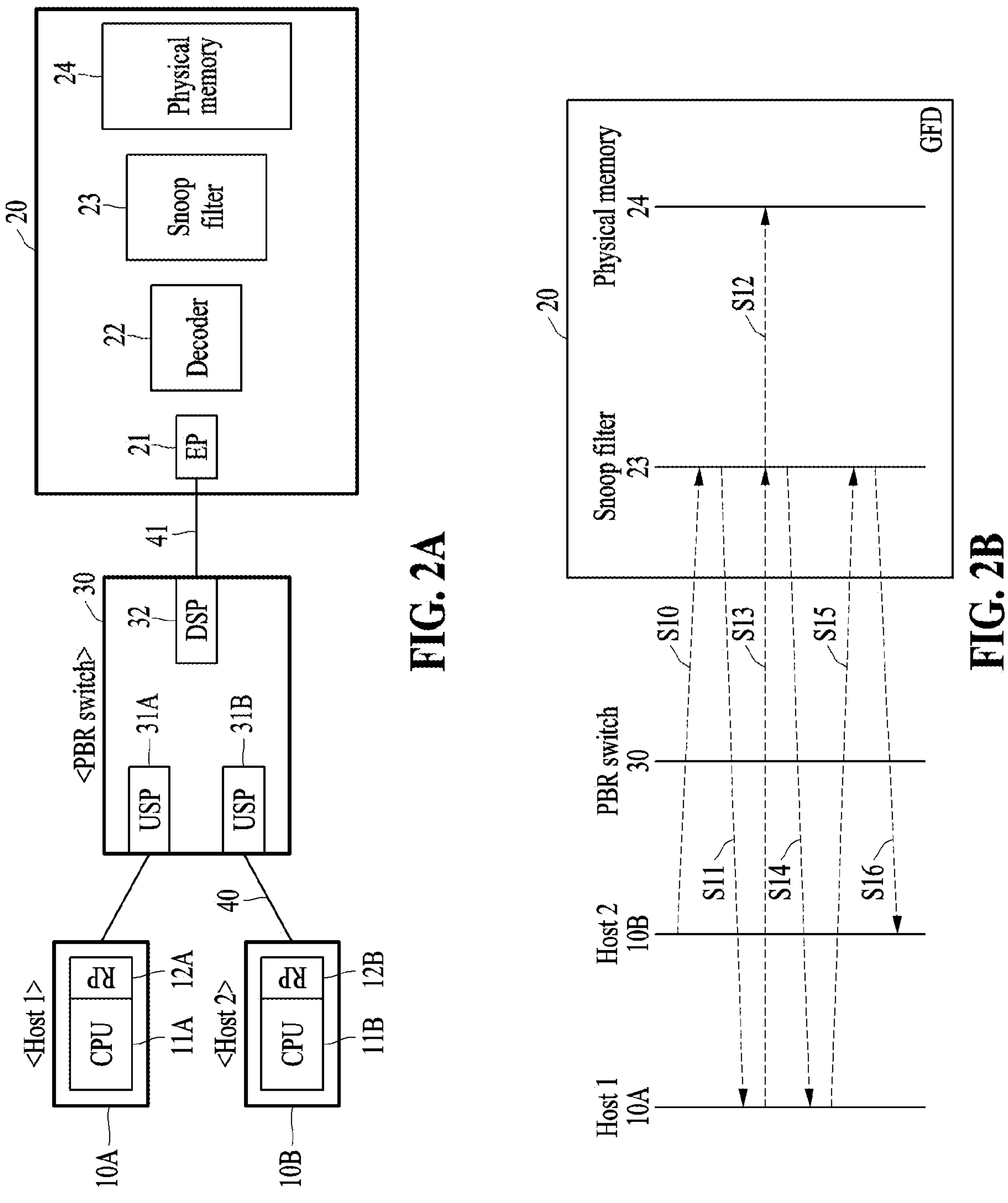
FIGS. 2A and 2B are diagrams illustrating a global fabric attached memory (G-FAM) device (GFD) connected to a CXL fabric to function as a cache-coherent distributed shared memory (DSM).

FIGS. 2A and 2B are diagrams illustrating a GFD connected to a CXL fabric to function as a cache-coherent DSM.

Referring to FIG. 2A, a GFD (e.g., a cache-coherent DSM) 20 may be connected to a host 1 10A and a host 2 10B via a PBR switch 30 included in a CXL fabric.

The GFD 20 may include an endpoint (EP) 21, a decoder 22, a snoop filter 23, and a physical memory 24. The EP 21 may be connected to a DSP 32 of the PBR switch 30 to transmit and receive a PBR flit. The decoder 22 may decode addresses included in the PBR flit, check whether each of the hosts 10A and 10B is able to access the memory 24, and calculate an address value of the memory 24. The snoop filter 23 may store states and owner information of cache line data and maintain cache coherency among multiple hosts.

FIG. 2B shows an example cache coherency management operation between two hosts based on a GFD (e.g., 20). A host 2 10B may transmit a cache line data request (e.g., transmit an M2S Req message of the CXL.mem protocol) to the snoop filter 23 in step S10.

The snoop filter 23 may check states and owner information of cache line data corresponding to the cache line data request. When a host 1 10A owns the requested cache line data, the snoop filter 23 may transmit a back-invalidation request to the host 1 10A (e.g., transmit an S2M Back-Invalidation Snoop (BISnp) message of the CXL.mem protocol) in step S11.

The host 1 10A may change (e.g., downgrade) ownership of the cache line data in response to the back-invalidation request. The host 1 10A may return dirty data (e.g., data before data modified by a host is reflected in a memory) to the memory to change a state of the cache line data (e.g., transmit an M2S Request with Data (RwD) message of the CXL.mem protocol) in step S12.

The snoop filter 23 may record the received data in the memory in step S13. The snoop filter 23 may transmit, to the host 1 10A, a response indicating that the recording is completed (e.g., transmit an M2S No Data Response (NDR)) in step S14.

The host 1 10A may transmit a back-invalidation response (e.g., M2S Back-Invalidation Response (BIRsp)) to indicate that the ownership of the cache line data is relinquished in step S15.

Since the state of the host 1 10A has changed, the snoop filter 23 may transmit a new cache state and data to the host 2 10B in step S16. Hereinafter, a cache coherency management protocol will be described in detail with reference to FIG. 3.

Figure 3:
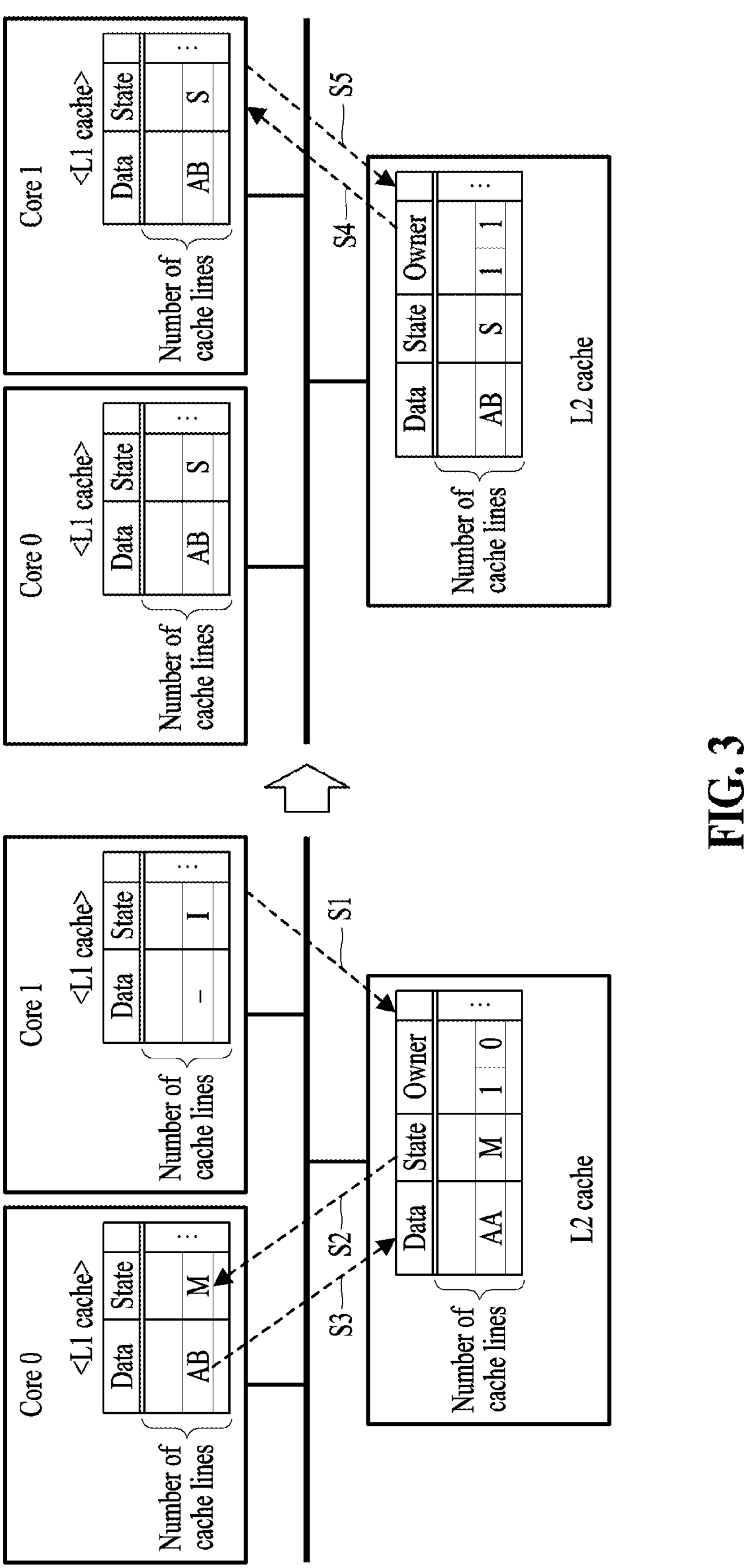
FIG. 3 is a diagram illustrating a MESI state-based cache coherency management protocol.

FIG. 3 is a diagram illustrating MESI-based cache coherency management protocol. To maintain cache coherency, a CXL protocol may use 64-byte cache line data and an MESI cache state. A cache line may refer to a unit for managing a cache state. The MESI cache state may include four states: M (Modified-Unique Dirty), E (Exclusive-Unique Clean), S (Shared-Shared Clean), and I (Invalid-Not shared). The MESI cache state may indicate whether cache line data is shared (Shared or Unique) and whether data matches between memories (Clean or Dirty).

Referring to FIG. 3, two cores (e.g., core 0 and core 1) may each include a private L1 cache. The core 0 may store cache line data in state M. An L2 cache shared by the two cores may store states and owner information of all cache line data that the L2 cache itself is able to store. Here, an owner may refer to an entity that stores cache line data in its own cache when a state of the cache line data is not invalid. The L2 cache may record information indicating that a current state of cache line data is M and an owner is the core 0.

In a case in which the core 1 is to read specific cache line data, the core I may search the L1 cache for the cache line data. Because the L1 cache of the core 1 does not store the cache line data (i.e., in state I), the core 1 may transmit a specific cache line data request to the L2 cache in step S1.

The L2 cache may check the current state of the specific cache line data and check whether to immediately respond to the core 1. Because the specific cache line data is currently in state M, the L2 cache may respond to the core 1 after changing (e.g., downgrading) the authority to state S. Therefore, the L2 cache may transmit, to the core 0 which is a current owner, a request (snoop) for changing (e.g., downgrading) the authority to state S in step S2.

To change the state of its cache line data to S, the core 0 may return dirty data to the L2 cache and inform that the state of the cache line data has changed in step S3.

The L2 cache may update the cache line with the returned dirty data and change the state to S. The L2 cache may transmit the cache line data of state S to the core 1 in step S4.

The L1 cache of the core 1 may respond to the L2 cache after storing the transmitted cache line data in step S5, and the L2 cache may add the core 1 to owner information of the cache line data.

Back-invalidation added to the CXL 3.0 protocol defines a snoop operation that changes (e.g., downgrades) a cache state (e.g., S2 and S3), and may thus be a required protocol for implementing a cache-coherent DSM.

Figure 4A:
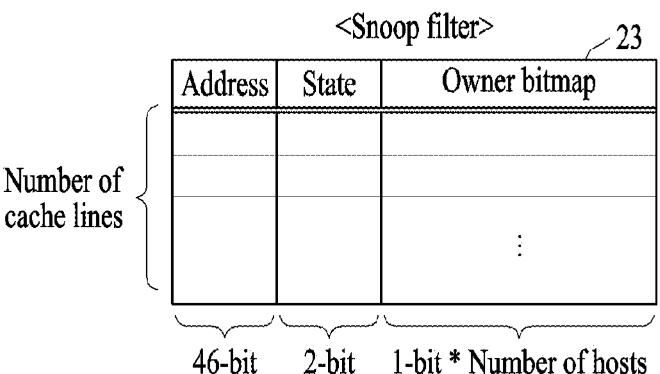
FIGS. 4A and 4B are diagrams illustrating limitations of a memory-based cache coherency management protocol.
Figure 4B:
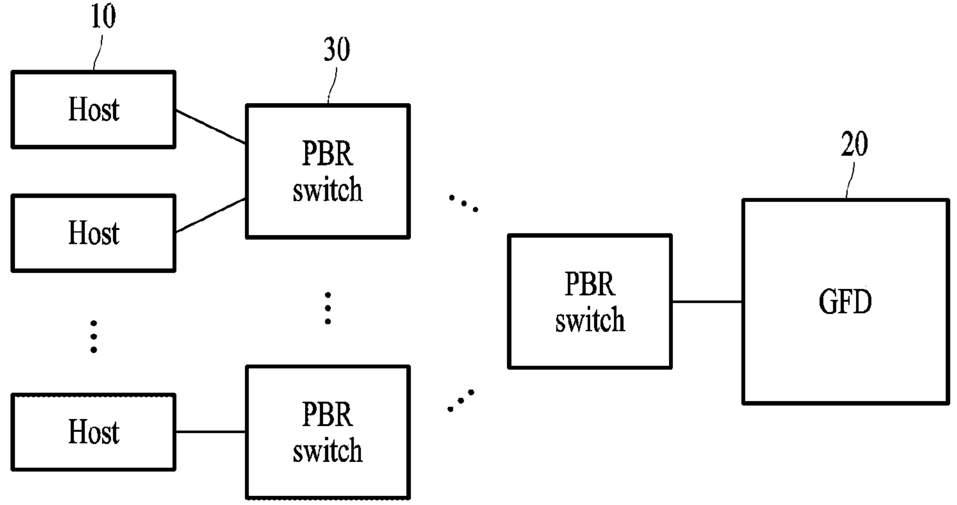

FIGS. 4A and 4B are diagrams illustrating limitations of a memory-based cache coherency management protocol.

FIG. 4A shows the size of a snoop filter 23 for cache coherency management. As described above, cache coherency management between host servers may be performed by a memory device (e.g., the GFD 20 of FIG. 2A). The snoop filter 23 included in the GFD 20 may store states and owner information (e.g., owner bitmap) of cache line data. The following describes the size and practical implementation of the snoop filter 23 that performs cache coherency management between 200 host servers.

To represent 64-byte (2^6) cache line data in the CXL standard, which uses a 52-bit address space, the snoop filter 23 may store a 46-bit (52-6-46 bits) address value for each cache line data.

Because an MESI state (e.g., a state of cache line data) may be represented as a 2-bit value, the snoop filter 23 may store the 2-bit MESI state for each cache line data.

The snoop filter 23 may store owner information corresponding to the number of hosts to be accessed simultaneously, for each cache line data.

Thus, in a case in which a GFD (e.g., a GFD including the snoop filter 23) (e.g., a GFD 20 of FIG. 4B) is to support up to 200 hosts simultaneously (e.g., cache coherency management), 248bi (31-byte) (=46+2+200) metadata may be required for each single cache line. Under the assumption that the snoop filter 23 manages 10 megabytes (MB)-sized data per host, the number of pieces of cache line data managed by the GFD 20 may be 32,768,000 (200*10 MB/64 bytes), and the size of the snoop filter 23 may be approximately 1 gigabyte (GB). Since it is not feasible to construct a 1 GB static random-access memory (SRAM) (e.g., due to power consumption and semiconductor area limitations), it may be substantially impractical to implement the snoop filter 23 that performs cache coherency management among the 200 hosts.

In a case in which the snoop filter 23 is implemented in a different way (e.g., as a dynamic random-access memory (DRAM)), the time used to read a cache line state from the snoop filter 23 may increase hundreds of times, and thus the performance of a cache-coherent DSM may be greatly degraded. One way to address this may be to reduce owner bitmap, which accounts for a large part of the size of the snoop filter 23. In states M and E, there is always one owner, and thus storing the number of the owner may be performed (e.g., because only 8 bits are required to store a number from 0 to 200), instead of storing 200 bits. This may reduce the size of the snoop filter 23 to 22.6% (approximately 220 MB), but the size is still too large to implement an SRAM. In addition, an accurate owner that stores an S-state cache line is not known, and thus a back-invalidation request may be required to be transmitted to all hosts connected to the GFD 20. This may increase the overall intra-network traffic, which may reduce the performance of all memory requests over the network.

FIG. 4B shows an example of using multiple PBR switches (e.g., 30) to connect multiple hosts (e.g., 10) to a single GFD 20. Because there is a limit on the number of ports that may be included in a PBR switch 30, multiple switches may need to be used to connect hundreds of hosts. Because the GFD 20 performs cache coherency management, a host 10 may need to transmit a message all the way to the GFD 20 each time for the cache coherency management. With a latency of about 60 nanoseconds (ns) being used for each switch, the worst case (e.g., requiring six message exchanges as shown in FIG. 2B) may be an occurrence of a memory access latency overhead that is (#switches between host and GFD)×6×60 ns.

As described above with reference to FIGS. 2A to 4B, a GFD-based inter-host cache coherency management method may have potential issues of physical implementation and latency. A switch-based inter-host cache coherency management method according to an embodiment will be described in detail below with reference to FIGS. 11A to 11I.

Figure 5:
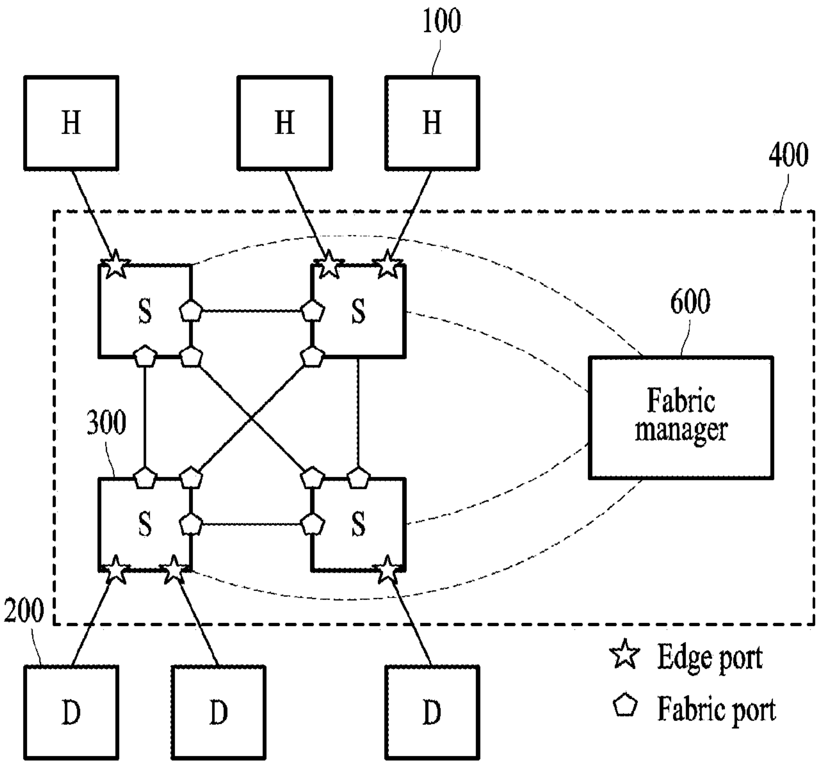
FIG. 5 is a diagram illustrating a CXL fabric according to an embodiment.
Figure 6:
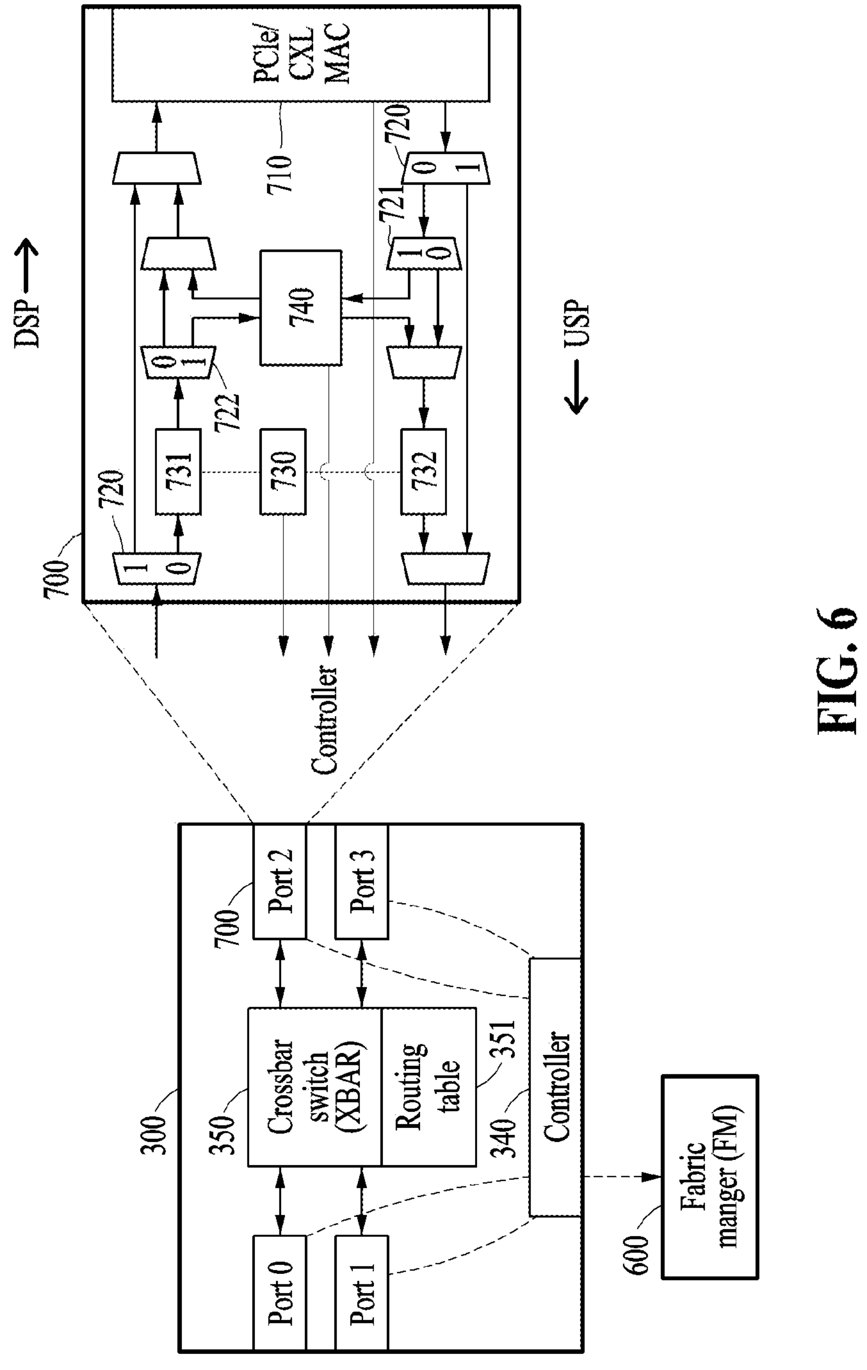
FIG. 6 is a diagram illustrating a structure of a port-based routing (PBR) switch that is a component of a CXL fabric according to an embodiment.

FIG. 5 is a diagram illustrating a CXL fabric according to an embodiment, and FIG. 6 is a diagram illustrating a structure of a PBR switch that is a component of a CXL fabric according to an embodiment.

The following describes the structure and operations of a CXL fabric 400, along with the related rules. The CXL fabric 400 according to an embodiment may embody the concepts presented in the CXL 3.0 protocol.

Rule 1: A host server (hereafter, a host) (e.g., 100) may be indicated as H. A host connected to an edge USP with a PBR ID of x may be indicated as $H_x$.

Rule 2: A device (e.g., 200) may be indicated as D. A device connected to an edge DSP with a PBR ID of x may be indicated as $D_x$. The device may be a GFD, an HBR switch, a CXL device (Type 1, Type 2, or Type 3), or a PCIe device.

Rule 3: A PBR switch may be indicated as S. A PBR switch with a unique number of x may be indicated as $S_x$.

Rule 4: A port of a PBR switch may be indicated as P. An yth port of a PBR switch with a unique number of x may be indicated as $S_xP_y$.

In this case, the unique number may refer to a number that identifies different devices and switches and, for example, a serial number may be used as this unique number.

FIG. 5 shows a block diagram of a CXL fabric 400 proposed in the CXL 3.0 protocol according to an embodiment. The CXL fabric 400 may connect a plurality of host servers (e.g., hosts 100) and a plurality of devices (e.g., devices 200) to construct a single CXL network. The CXL fabric 400 may include at least one PBR switch (e.g., 300) and a fabric manager 600. A connection between the at least one PBR switch 300 and the fabric manager 600 may use a dedicated network (e.g., management component transport protocol (MCTP), system management bus (SMBus), or Ethernet).

The at least one PBR switch 300 may connect a host server (e.g., 100), a device (e.g., 200), or another PBR switch to implement the CXL network. The fabric manager 600 may collectively manage the at least one PBR switch 300.

FIG. 6 shows a detailed block diagram of a PBR switch (e.g., 300) proposed in the CXL 3.0 protocol. The PBR switch 300 may include a routing table 351 that stores therein routing information associated with routing paths in a CXL network. The PBR switch 300 may include two or more ports (e.g., 700) that function as an USP, a DSP, or an FP. The PBR switch 300 may include a crossbar switch 350 that sets a connection path (e.g., crossbar) between the two or more ports based on the routing information. The PBR switch 300 may include a controller 340 that controls (e.g., monitors and changes the settings) the routing table 351, the two or more ports 700, and the crossbar switch 350. The controller 340 may communicate with a fabric manager 600 to report a state of the PBR switch 300 to the fabric manager 600 or to process commands transmitted from the fabric manager 600.

A port 700 of the PBR switch 300 may include a PCIe/CXL controller 710. The port 700 may include multiplexers (e.g., muxes 720, 721, and 722) that determine an in-port transmission path of an incoming message into the port 700. The port 700 may include format conversion modules 730, 731, and 732 that convert a format of messages (e.g., incoming messages into the port 700). The port 700 may include an edge port controller 740 that performs initialization and setup of an edge port. The port 700 may transmit only a PBR message to the crossbar switch 350, regardless of the format of an incoming message input to the port 700.

FIGS. 7A and 7B are diagrams illustrating a topology determination operation of a CXL network according to an embodiment.

According to an embodiment, a system administrator (e.g., an administrator of a CXL fabric) may physically connect a plurality of host servers and a plurality of devices. A PBR switch (e.g., the PBR switch 300 of FIG. 6) may discriminate (e.g., identify) types of neighboring ports connected to each port (e.g., the port 700 of FIG. 6). The PBR switch 300 may collect information about the neighboring ports. The PBR switch 300 may transmit the collected information to a fabric manager (e.g., the fabric manager (or indicated as FM) 600 of FIG. 6).

Using the information transmitted from all PBR switches (e.g., 300), the fabric manager 600 may determine an entire topology of a CXL network. Once determining the topology, the fabric manager 600 may obtain a list of hosts and devices included in the CXL network. The fabric manager 600 may assign a unique PBR ID to each edge port of the PBR switch 300. The following describes in detail how each port (e.g., 700) of the PBR switch 300 identifies a type of a counterpart port (e.g., a neighboring port).

When power is applied to the PBR switch 300, all ports (e.g., 700) of the PBR switch 300 may attempt to establish electrical connections with their physically connected counterpart ports. A port 700 may use information (e.g., modified TS (training sequence) 1/TS2 ordered sets) exchanged with its counterpart port to identify whether the counterpart port is a host (e.g., a host server), a device (e.g., a GFD, a PCIe device, a CXL device, and an HBR switch), or a PBR switch. For example, in the case of the counterpart port being a device, the port 700 may use a unique number of the device obtained from a configuration space (or Config Space as indicated herein) of the device to identify the counterpart port. For another example, in the case of the counterpart port being a PBR switch, the port 700 may use a unique number of the PBR switch obtained from a vendor-defined message (VDM) to identify the counterpart port.

FIG. 7A shows examples of types (e.g., a DSP of a PCIe host, a DSP of a CXL 1.1 host, etc.) of counterpart ports to be connected to a port (e.g., 700) of a PBR switch (e.g., 300) and settings of the port 700 (e.g., PCIe only-set as an edge USP, CXL HBR-set as an edge USP, etc.).

FIG. 7B shows a type of a counterpart port (e.g., a neighboring port), information obtainable during a process of establishing a connection between ports, and an unidentified set. Because port settings of a PBR switch differ depending on a type of a counterpart port, it may be essentially required to accurately identify the type of the counterpart port.

An unidentified set 1 701 may include a port of a PCIe host and a DSP of a PCIe switch. In the case of a counterpart port being the port of the PCIe host or the DSP of the PCIe switch, the unidentified set 1 701 may not be an issue because port settings of a PBR switch (e.g., 300) are the same (e.g., PCIe-only edge USP).

An unidentified set 2 702 may include a port of a CXL 2.0 or higher host and a DSP of an HBR switch. To discriminate between the port of the CXL 2.0 or higher host and the DSP of the HBR switch, the PBR switch 300 may use a variation of a modified TS1/TS2 ordered set that is transmitted and received in a PCIe link-based alternate protocol negotiation (APN) process with a neighboring port.

FIG. 7C shows a modified bit 704 in a modified TS1/TS2 ordered set. Based on the modified TS1/TS2 ordered set shown in FIG. 7C, a PBR switch (e.g., 300) may discriminate between a port of a CXL 2.0 host and a DSP of an HBR switch.

An unidentified set 3 703 may include a fabric port (or FP as indicated herein) of a PBR switch and a port of a GFD. Because there is no configuration space (e.g., a PCI configuration header type) on GFDs and PBR switches using a PBR flit, it may be difficult to discriminate between a fabric port of a PBR switch and a port of a GFD. The PBR switch 300 may newly define a VDM and use the newly defined VDM.

FIG. 7D shows newly defined VDMs 705 and 706. Because the VDMs 705 and 706 are transmitted and received over a PBR link, the VDMs 705 and 706 may include a PBR transaction layer packet (TLP) header (hereinafter, a PTH). Because a source PBR ID (SPID) and a destination PBR ID (DPID) are not determined at the time of exchange of the VDMs 705 and 706, corresponding areas may be filled with zeros (0s) in the VDMs 705 and 706. The VDMs 705 and 706 may have a type (e.g., Type[2:0]==100) of a TLP that is determined using local routing rules to prevent a counterpart receiving a VDM from routing the VDM elsewhere. The VDMs 705 and 706 are CXL VDMs, and thus a vendor ID may be set to 0x1E98. A message code of the VDMs 705 and 706 may be Vendor_Defined Type 0 (Message Code=0x7E).

The VDM 705 may be transmitted from a port (e.g., 700) of a PBR switch to a neighboring port (e.g., a counterpart port). The length of the VDM 705 may have 0h written thereon, and a CXL VDM code 705-1 of the VDM 705 may have a code indicating that it is a unique number request message.

The VDM 706 may be a message that a port of a GFD or a port of a PBR switch receiving the VDM 705 responds with. In the VDM 705, there may be data (Type[6]==1) with a length of 2DW (Length==1). The data of the VDM 705 may include a unique number (e.g., a serial number). Based on a CXL VDM Code 706-1 of the VDM 706, a GFD port and a fabric port of a PBR switch may be discriminated.

Figure 7E:
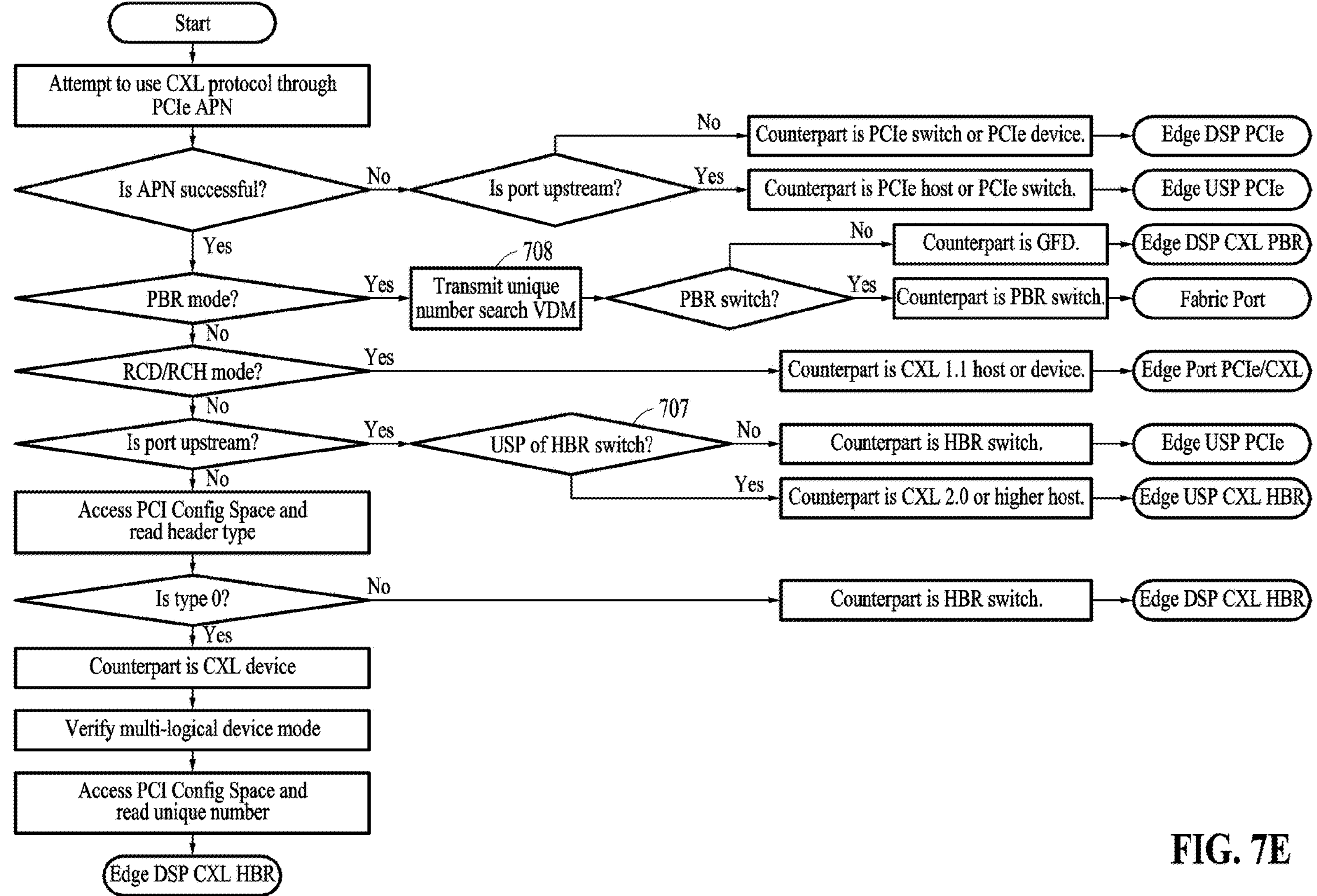

FIG. 7E shows an example of an algorithm performed by all ports (e.g., 700) of a PBR switch 300 to identify a type of a counterpart port. Step 707 may be a newly established step to discriminate between a port of a CXL 2.0 host and a DSP of an HBR switch, and step 708 may be a newly established step to discriminate between a port of a PBR switch and a port of a GFD.

When all the ports (e.g., 700) of the PBR switch 300 have performed all steps shown in FIG. 7E, the PBR switch 300 may collect information about neighboring ports. The PBR switch 300 may transmit the collected information to a fabric manager (e.g., the fabric manager 600).

FIG. 7F shows an example of a message format used by a PBR switch (e.g., 300) to transmit collected information to a fabric manager (e.g., 600). A message may basically include a unique number of the PBR switch 300 and the number of ports included in the PBR switch 300. The message may include 10-byte information per port. The port information may include a port number, a port state, a type of a connected counterpart port (e.g., neighboring port), and a unique number (e.g., a serial number) of a switch connected to a corresponding port.

Referring to FIG. 7G, a fabric manager (e.g., 600) may determine a topology of a CXL network based on information received from all PBR switches (e.g., 300). The fabric manager 600 may use an algorithm shown in FIG. 7G. The fabric manager 600 may determine the topology of the CXL network by assigning PBR IDs to edge ports (e.g., an USP and a DSP) of the PBR switches (e.g., 300), respectively, and generating connectivity between the PBR switches.

The connectivity between the PBR switches may be represented by, but is not limited to, an adjacency matrix, which is a matrix representing connectivity between PBR switches by treating the PBR switches as nodes.

Figure 8A:
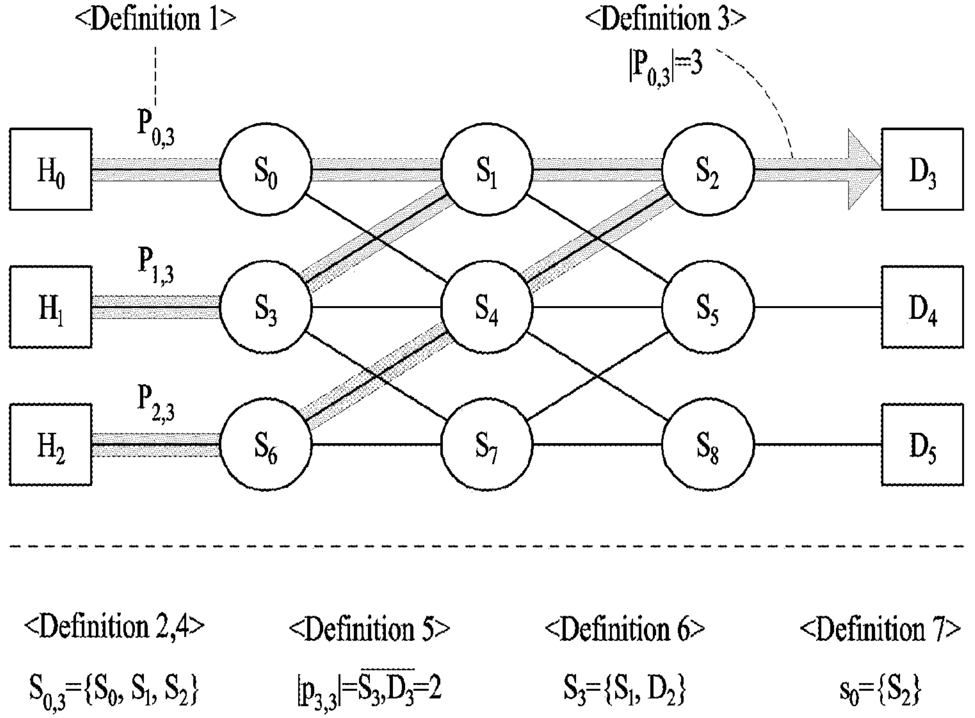

FIGS. 8A through 8C are diagrams illustrating a routing path setting operation according to an embodiment.

According to an embodiment, a system administrator (e.g., an administrator of a CXL fabric) may perform assignments between elements (e.g., host servers and devices) based on a topology of a CXL network. For example, it may determine which host server of host servers (hereafter, hosts) use which device (e.g., a GFD, a PCIe device, a CXL device, and an HBR switch) (e.g., assign a specific device to a specific host or assign a specific host to a specific device).

A fabric manager (e.g., the fabric manager 600 of FIG. 6) may set (e.g., explore) routing paths within the CXL network in response to the assignment between the elements by the system administrator. A routing path may include a path that connects a host and a device to route a message. The fabric manager 600 may set the routing paths based on quality of service (QOS) conditions (e.g., latency) and a routing path setting algorithm.

FIG. 8A shows examples of routing paths set based on the following routing path setting algorithm. The routing path setting algorithm may be based on a shortest path exploration algorithm and/or predicted traffic of pre-assigned paths.

Definition 1: There is necessarily one routing path $P_{x,y}$ that connects a host $H_x$ and a device $D_y$.

Definition 2: There are necessarily one or more switches on the routing path $P_{x,y}$.

Definition 3: The distance $|P_{x,y}|$ between $H_x$ and $D_y$ is defined by the number of switches present on $P_{x,y}$.

Definition 4: For N different hosts $H_a$, $H_b$, . . . using the same device $D_y$, there is necessarily at least one same element (e.g., switch) in switch sets $S_{a,y}$, $S_{b,y}$, . . . present on respective routing paths $P_{a,y}$, $P_{b,y}$, . . . (e.g., the number of elements (e.g., switches) in a set $\{S_{a,y} \cap S_{b,y} \cap \ldots\}$ is at least 1).

Definition 5: For an arbitrary switch $S_i$ belonging to $S_{x,y}$, the distance $|p_{i,y}|$ between $S_i$ and $D_y$ is defined by the number of switches present on a subpath $p_{i,y}$.

Definition 6: Switches belonging to the switch set $S_y$ manage cache coherency between the hosts $H_a$, $H_b$, . . . $S_y$ is a set of switches excluding switches that satisfy the following subrule from a switch set $\{S_{a,y} \cup S_{b,y} \cup \ldots\}$.

Subrule: A switch that transmits snoops to only a single host among hosts $H_a$, $H_b$, . . . using (e.g., sharing) the device $D_y$.

Definition 7: For each switch $S_i$ belonging to the switch set $S_y$, a switch subset $S_n$ may be formed based on a distance to the device $D_y$. The distance between switches included in the switch subset $s_n$ and the device $D_y$ is n.

Definition 8: A sum of the number of cache lines managed by switches included in the switch subset $s_n$ is less than a sum of cache lines managed by switches included in $S_{n+1}$.

Based on the routing path setting algorithm, the fabric manager 600 may set routing paths such that any one of the routing paths connecting a specific host server and a specific device is unique.

For example, as shown, a path $P_{0,3}$ may be a path connecting a host $H_0$ and a device $D_3$. The path $P_{0,3}$ may be $H_0 \rightarrow S_0 \rightarrow S_1 \rightarrow S_2 \rightarrow D_3$. A path $P_{1,3}$ may be a path connecting a host $H_1$ and the device $D_3$. The path $P_{1,3}$ may be $H_1 \rightarrow S_3 \rightarrow S_1 \rightarrow S_2 \rightarrow D_3$. A path $P_{2,3}$ may be a path connecting a host $H_2$ and the device $D_3$. The path $P_{2,3}$ may be $H_2 \rightarrow S_6 \rightarrow S_4 \rightarrow S_2 \rightarrow D_3$. The hosts $H_0$, $H_1$, and $H_2$ may share the device $D_3$.

According to Definition 4, $\{S_{0,3} \cap S_{1,3} \cap S_{2,3}\} = S_2$.

According to Definition 6, switches $\{S_1, S_2\}$ belonging to a switch set $S_3$ may manage cache coherency among the hosts $H_0$, $H_1$, and $H_2$. An inter-host cache coherency management algorithm will be described in detail below with reference to FIGS. 11A to 11I.

Referring to FIG. 8B, the fabric manager 600 may generate routing information associated with routing paths (e.g., $P_{x,y}$). The routing information may include configuration information (e.g., information about connection paths (crossbars) between ports included in switches) to be transmitted to the switches on the routing paths. To generate the routing information, the fabric manager 600 may use an algorithm shown in FIG. 8B.

FIG. 8C shows an example of a format of a message (e.g., a message including routing information) transmitted by a fabric manger (e.g., 600) to a PBR switch (e.g., 300). The message may include the number of routing information, a port number, and a PBR ID value to be added to/deleted from a routing table.

Figure 9A:
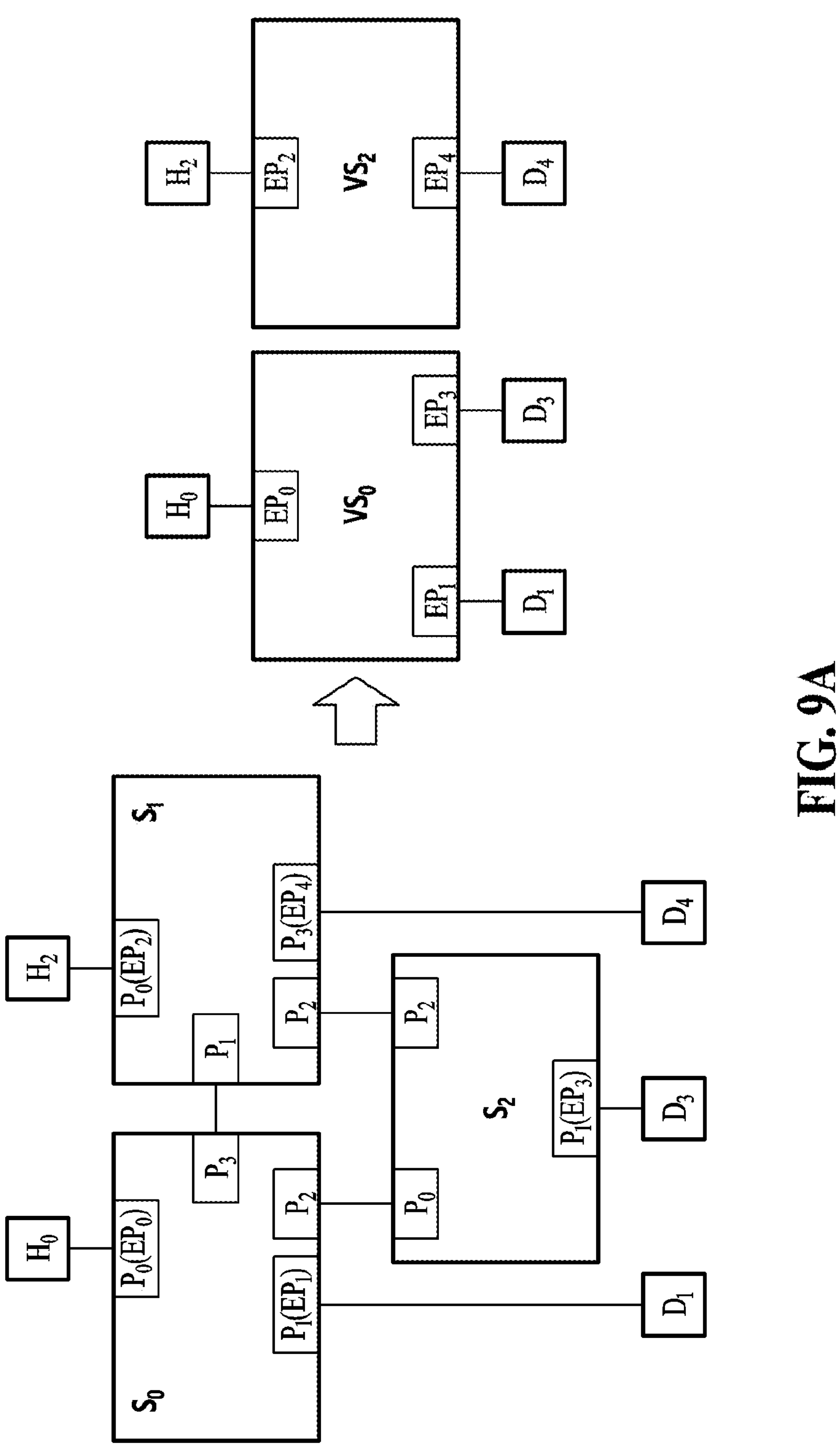

FIGS. 9A and 9B are diagrams illustrating a device enumeration operation according to an embodiment.

According to an embodiment, each host server (hereinafter, host) (e.g., the host 100 of FIG. 5) may perform a device enumeration process after a routing path is set in a CXL fabric (e.g., the CXL fabric 400 of FIG. 5). To support the device enumeration process defined in PCIe, a PBR switch (e.g., the PBR switch 300 of FIG. 5) may include metadata (e.g., metadata for identifying a PBR switch as at least some of virtual switches). One virtual switch may correspond to one host server. A virtual switch may be defined to directly connect a host server and at least one device assigned to the host server. One virtual switch may be one logical HBR switch.

FIG. 9A shows examples of virtual switches set based on a virtual switch setting algorithm.

Definition 1: A virtual switch has necessarily one USP and zero or more DSPs.

Definition 2: Each port of a virtual switch is necessarily mapped to an edge port.

Definition 3: A virtual switch whose USP (e.g., edge USP) has a PBR ID of x is indicated as $VS_x$.

Devices $D_1$ and $D_3$ may be assigned to a host $H_0$, and a device $D_4$ may be assigned to a host $H_2$. System software of each host may not recognize PBR switches (e.g., $S_0$, $S_1$, and $S_2$) that constitute a CXL fabric but may recognize only virtual switches (e.g., $VS_0$ and $VS_2$) that consist of only edge ports. The system software of each host may enumerate and initialize devices through a virtual switch (e.g., $VS_0$ and $VS_2$).

FIG. 9B shows an example of metadata 910 (e.g., metadata stored to implement a virtual switch) stored by an edge port controller 740 present on each port (e.g., 700) of a PBR switch (e.g., 300).

Of ports of the PBR switch 300, an edge USP may store one set of metadata. Of the ports of the PBR switch 300, an edge DSP may store 16 sets of metadata. This may be because, when a multi-logical device (MLD) is connected to the edge DSP, up to 16 edge USPs may be connected to one edge DSP.

An edge port may recognize its primary bus number (e.g., on a PCI bridge, the number of a bus connected to its upstream (host direction)) and its secondary bus number (e.g., on the PCI bridge, the number of a bus connected to its downstream (device direction)). In addition, the edge port may check an ID value (e.g., a unique number that discriminates devices in a PCI protocol) (e.g., 8-bit bus, 5-bit device, and 3-bit function values) of a CXL.io packet input into the port to process access to a PCI configuration space.

The edge USP may set an in-port multiplexer (e.g., a mux) to a USP mux 721 to transmit a PCI configuration message heading to the edge port to the edge port controller 740. The edge DSP may set the in-port mux to a DSP mux 722 to transmit the PCI configuration message heading to the edge port to the edge port controller 740.

When the system software of each host sets a base address register (BAR), each port may set message flow settings (e.g., set a mux to the USP mux 721 or the DSP mux 722) to transmit a PCI memory message heading to the edge port to the edge port controller 740.

The system software of each host may perform port setting (or configuration) and device enumeration through a CXL register that resides in the PCI configuration space and the PCI BAR. The device enumeration process may follow the PCIe protocol and the CXL protocol.

As the PBR switch 300 is identified as at least some of virtual switches via prestored metadata 910 (e.g., refer to FIG. 9A), a typical PCIe device enumeration process may be supported without modification of the system software of hosts. Upon completion of device enumeration and initialization, each port may obtain information necessary for a message format conversion (e.g., a conversion between HBR and PBR messages) as described below with reference to FIGS. 10A to 10K.

FIGS. 10A through 10K are diagrams illustrating a message format conversion operation according to an embodiment.

According to an embodiment, ports (e.g., the port 700 of FIG. 6) included in a PBR switch (e.g., the PBR switch 300 of FIG. 6) may function as a fabric port (FP), an edge USP, or an edge DSP. A port among the ports (e.g., 700) that functions as an edge port (e.g., the edge USP and the edge DSP) may convert a format of an incoming message. The edge port may convert an HBR message to a PBR message and a PBR message to an HBR message. Specifically, for example, a first conversion module (e.g., the first conversion module 731 of FIG. 6) included in the edge port may convert a PBR message to an HBR message, and a second conversion module (e.g., the second conversion module 732 of FIG. 6) included in the edge port may convert the HBR message to a PBR message.

FIG. 10A shows examples of metadata used by the conversion modules 731 and 732 for a message format conversion and storage positions at which the metadata is stored. The metadata may be stored in a storage module (e.g., the storage module 730 of FIG. 6) or a controller (e.g., the controller 740 of FIG. 6). A storage module 730A and a controller 740A may be included in an edge USP, and a storage module 730B and a controller 740B may be included in an edge DSP.

The edge USP and/or edge DSP may each perform the conversion between HBR and PBR messages based on prestored metadata. A port connected on a message generation side may perform the message format conversion by including a DPID and a SPID in an incoming message in the port. A port connected on a message end side may perform the message format conversion by excluding a DPID and a SPID from an incoming message in the port. Hereinafter, the message format conversion operation that is broken down by protocol will be described in detail with reference to FIGS. 10B to 10I.

Figure 10B:
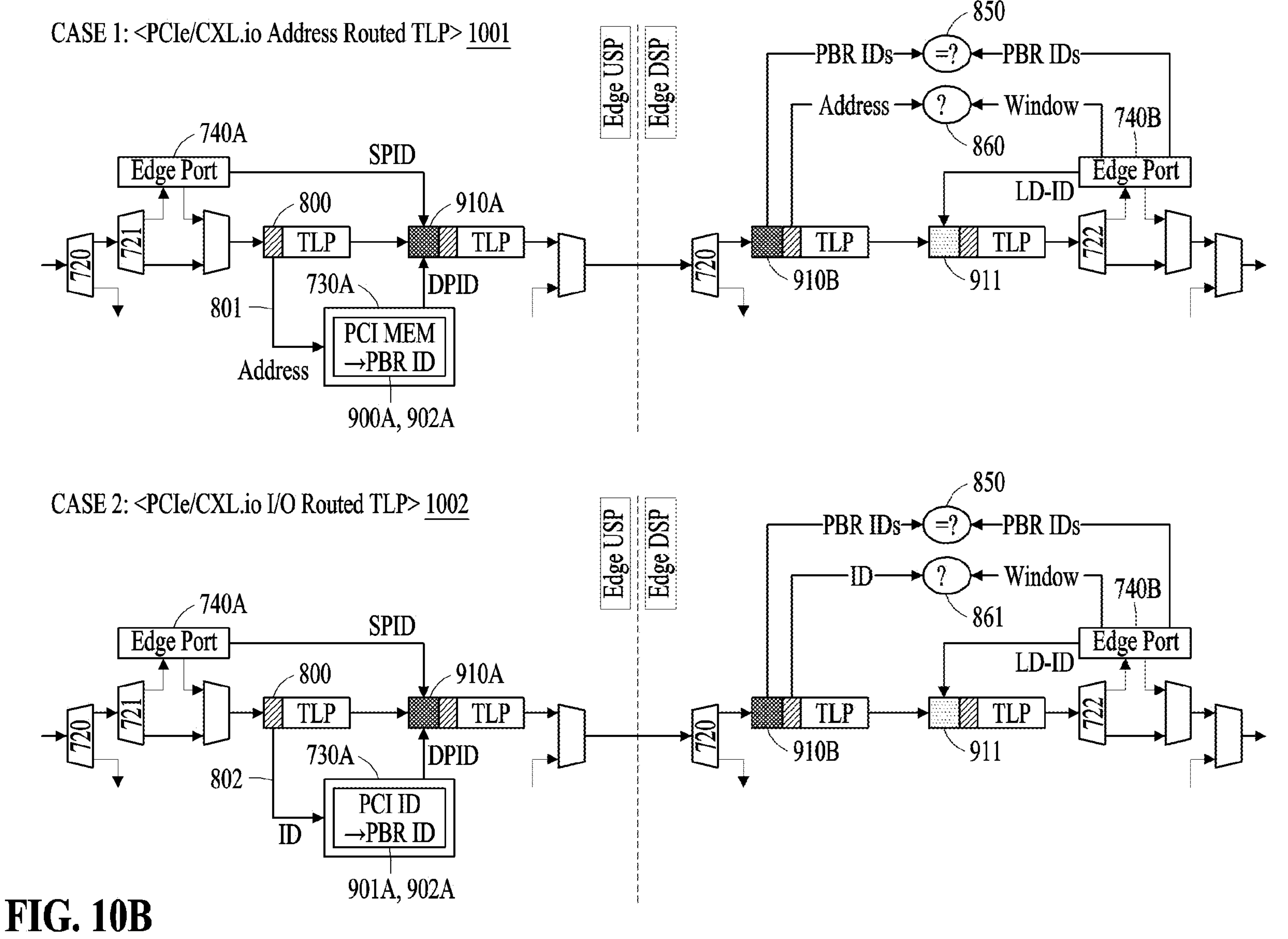

FIG. 10B shows an example process of converting an HBR message transmitted from a host server (hereinafter, a host) (e.g., the host 100 of FIG. 5) to a device (e.g., the device 200 of FIG. 5) (e.g., a GFD, a PCIe device, a CXL device, and an HBR switch), in the PCIe/CXL.io protocol.

A PCIe/CXL.io protocol-based request may be classified into Case 1 1001 with address-based routing and Case 2 1002 with ID-based routing. Although some PCIe messages use a specialized routing scheme, they may be processed the same as in Case 2 1002 with ID-based routing. An edge USP indicated in FIG. 10B may convert, into a PBR format, a TLP that is transmitted by the host to the device, and an edge DSP indicated in FIG. 10B may convert the PBR format back into the TLP. Although an output of the edge USP is shown in FIG. 10B as being directly input to the edge DSP, there may be a fabric port (and/or another PBR switch) between the edge USP and the edge DSP. It should be noted that the edge USP and the edge DSP shown in FIG. 10B may or may not be included in the same switch.

[Operations of Edge USP]

1. An edge USP (e.g., a second conversion module 732 that converts an HBR message to a PBR message) may read a header 800 of a TLP to check a type and a format field of the TLP input to the edge USP. The edge USP may determine whether the TLP belongs to Case 1 1001 or Case 2 1002.

2-1. In Case 1 1001, the edge USP may obtain a port number of a target DSP from a (prefetchable) memory window (e.g., a memory space consisting of a memory base and a memory limit of a PCI Type 1 configuration header) of the DSP, based on metadata 900A stored in a storage module 730A.

2-2. In Case 2 1002, the edge USP may obtain the port number of the target DSP from a bus window (e.g., a bus address consisting of a secondary bus and a subordinate bus of the PCI Type 1 configuration header) of the DSP, based on metadata 901A stored in the storage module 730A.

3. The edge USP may obtain a PBR ID from the port number of the target DSP based on metadata 902A of FIG. 10A. The obtained PBR ID may be set to a DPID. The edge USP (e.g., the second conversion module 732) may set its PBR ID to a SPID.

4. The edge USP may generate a PBR TLP header (PTH) 910A including the DPID and the SPID. The edge USP may transmit a TLP with the PTH 910A appended at the foremost to a crossbar switch (e.g., the crossbar switch 350 of FIG. 6).

[Operations of Edge DSP]

1. An edge DSP (e.g., a first conversion module 731 that converts a PBR message to an HBR message) may separate a PTH 910B from a TLP input to the edge DSP. The PTH 910B may be substantially the same as the PTH 910A. The edge DSP may obtain a SPID and a DPID from the PTH 910B.

2. For security purposes, the edge DSP may check whether the obtained SPID is the same as a PBR ID of the edge USP stored in the edge DSP itself and may check whether the obtained DPID matches a PBR ID of the edge DSP itself (e.g., selectively) in step 850.

3-1. In Case 1 1001, the edge DSP may obtain an address value from the TLP header. The edge DSP may check whether the obtained address value matches its BAR space or is included in a (prefetchable) memory window in step 860. If not included, the edge DSP may process the incoming TLP according to a PCI specification.

3-2. In Case 2 1002, the edge DSP may obtain an ID value from the TLP header. The edge DSP may check whether the obtained ID value matches its own ID or is included in a bus window in step 861. If not included, the edge DSP may process the incoming TLP according to the PCI specification.

4. In a case in which an MLD is connected to the edge DSP, the edge DSP may obtain a logical device ID (LD-ID) to be used as the SPID. Based on the obtained LD-ID, the edge DSP may generate an LD-ID TLP prefix 911. The edge DSP may add the LD-ID TLP prefix 911 to the front of the TLP.

5. A TLP obtained by the completion of conversion may be transmitted to a DSP mux 722. The DSP mux 722 may determine whether to transmit the TLP obtained by the conversion to an edge port controller 740B.

For reference, a PCI input/output (I/O) space has been deprecated, and thus an edge port and a virtual switch described herein may not route I/O addresses. If this function is implemented, a conversion method may be the same as address-based routing.

Figure 10C:
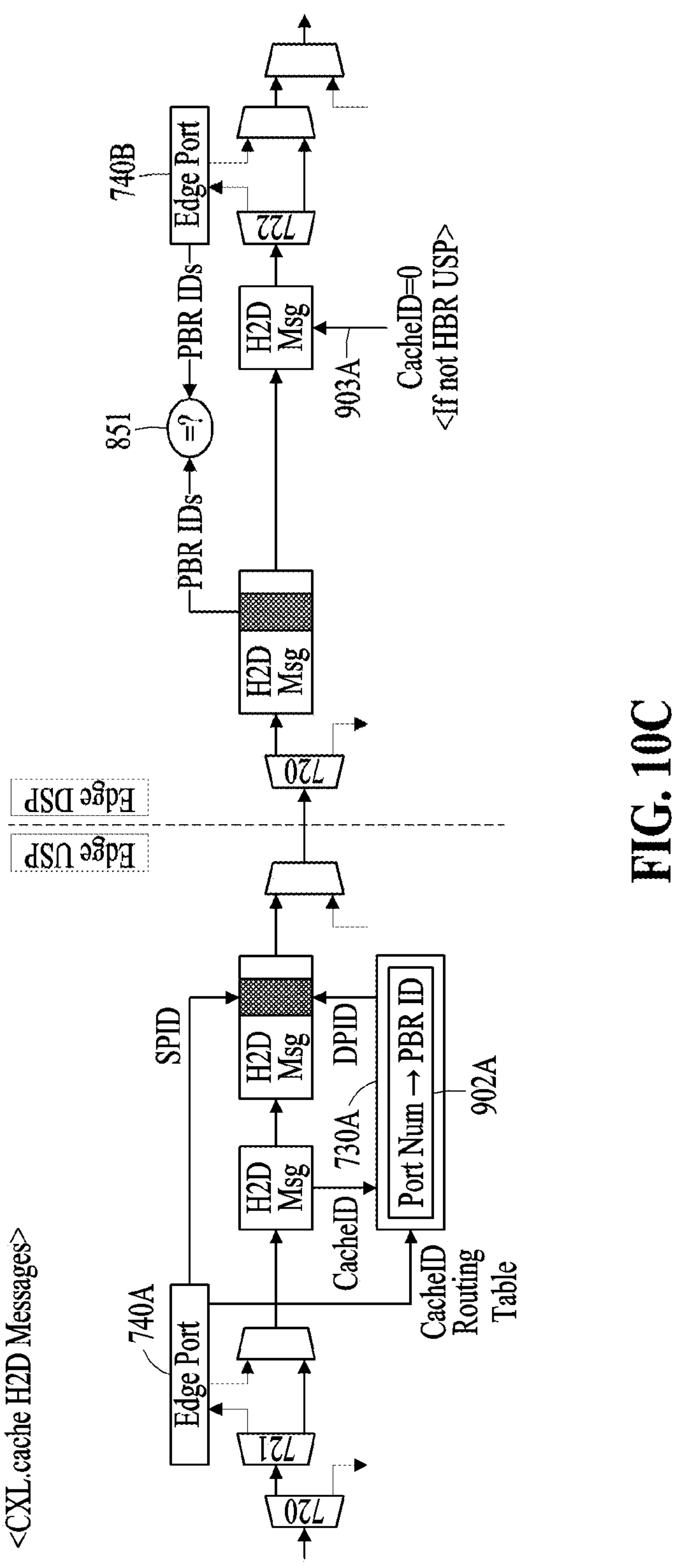

FIG. 10C shows an example process of converting an HBR message transmitted from a host server (hereinafter, a host) (e.g., the host 100 of FIG. 5) to a device (e.g., the device 200 of FIG. 5) (e.g., a GFD, a PCIe device, a CXL device, and an HBR switch), in the CXL.cache protocol.

In the CXL.cache protocol, H2D Req, H2D Resp, and H2D Data messages transmitted from the host to the device may all use only routing information referred to as CacheID. When a CacheID is given, a corresponding DSP port number may be stored in a cache ID routing table capability of a CXL register. An edge USP described with reference to FIG. 10C may convert an HBR message transmitted from the host to the device to a PBR message, and an edge DSP described with reference to FIG. 10C may convert the PBR message back to the HBR message. That is, it should be noted that the edge USP and the edge DSP shown in FIG. 10C may or may not be included in the same port, as described above with reference to FIG. 10B.

[Process of Edge USP]

1. An edge USP (e.g., a second conversion module 732 that converts an HBR message to a PBR message) may read a H2D HBR message and obtain a CacheID.

2. The edge USP may obtain a port number of a target DSP from the CacheID, based on a CacheID routing table (e.g., the CacheID routing table of FIG. 10A) that is stored in an edge port controller 740A.

3. The edge USP may obtain a PBR ID from the port number of the target DSP based on metadata 902A. The obtained PBR ID may be set to a DPID. The edge USP (e.g., the second conversion module 732) may set its PBR ID to a SPID.

4. The edge USP may generate an H2D PBR message including the DPID and the SPID. The edge USP may transmit the H2D PBR message including the DPID and the SPID to a crossbar switch (e.g., the crossbar switch 350 of FIG. 6).

[Process of Edge DSP]

1. An edge DSP (e.g., a first conversion module 731 that converts a PBR message to an HBR message) may obtain a SPID and a DPID from an H2D PBR message input to the edge DSP.

2. For security purposes, the edge DSP may check whether the obtained SPID is the same as a PBR ID of the edge USP stored in the edge DSP itself and may check whether the obtained DPID is the same as its own PBR ID (e.g., selectively) in step 851.

3. The edge DSP may generate an H2D HBR message (e.g., an H2D HBR message with the SPID and the DPID excluded) with a CacheID value being zero (0).

4. The H2D HBR message (e.g., the H2D HBR message with the SPID and the DPID excluded and the CacheID value being 0) obtained by the completion of conversion may be transmitted to a DSP mux 722.

For reference, an MLD does not support the CXL.cache protocol, and thus it may not process LD-IDs. In addition, setting the CacheID value to 0 may not handle a case in which an HBR switch is connected to the edge DSP, and a solution to this issue will be described below with reference to FIGS. 10J and 10K.

Figure 10D:
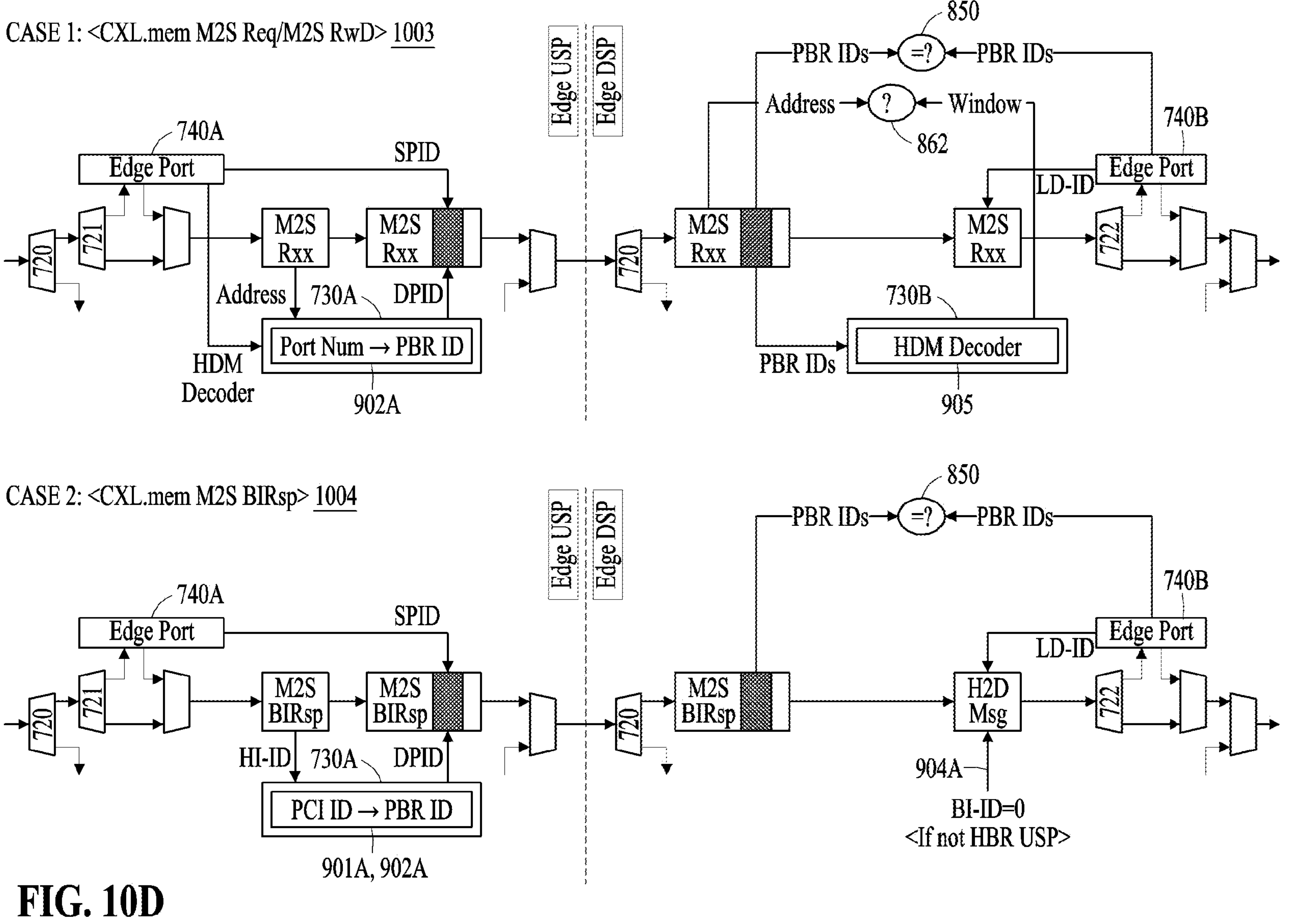
Figure 10E:
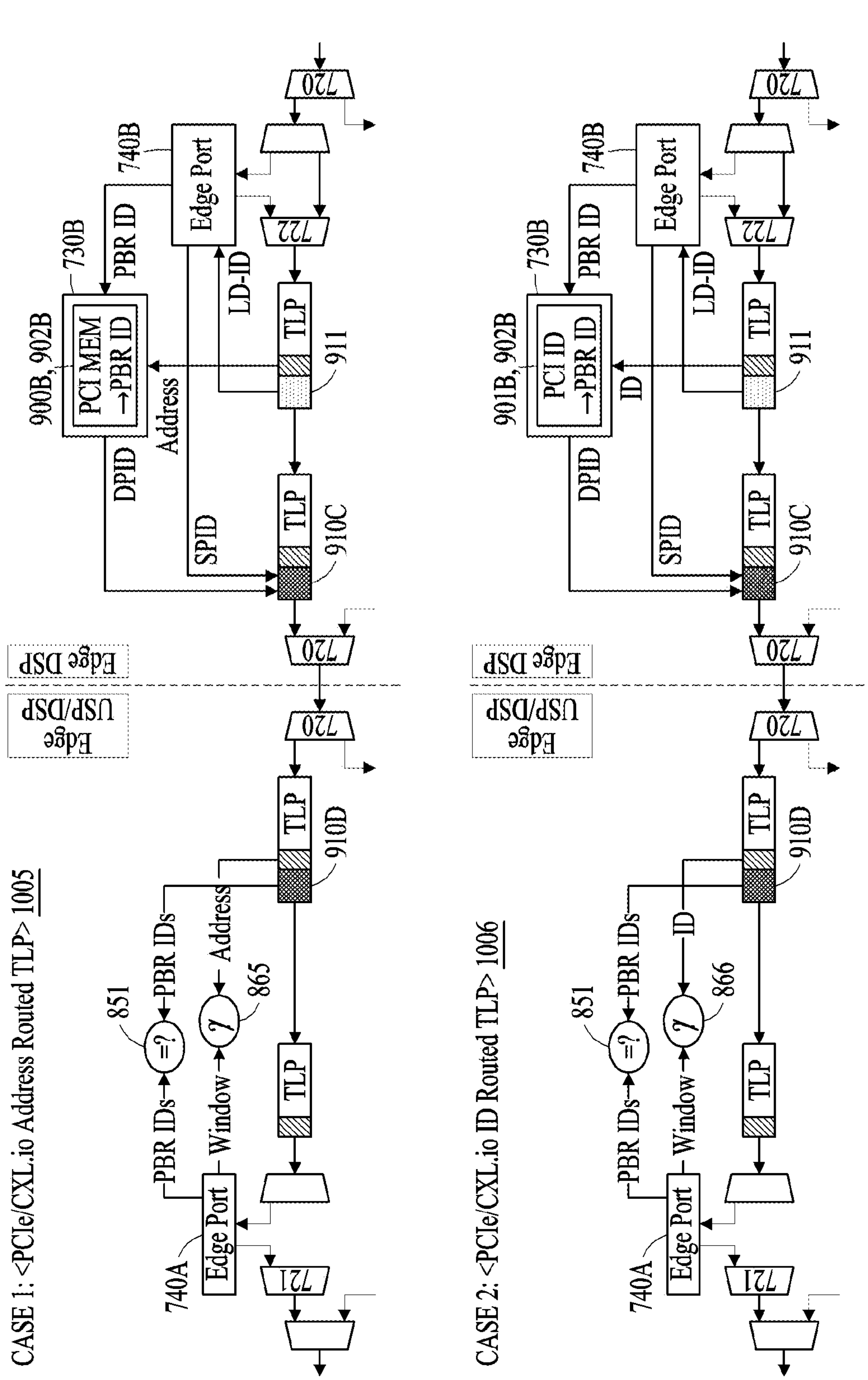

FIG. 10D shows an example process of converting an HBR message (e.g., M2S Req, M2S RwD, and M2S BIRsp) transmitted from a host server (hereinafter, a host) (e.g., the host 100 of FIG. 5) to a device (e.g., the device 200 of FIG. 5) (e.g., a GFD, a PCIe device, a CXL device, and an HBR switch), in the CXL.mem protocol. M2S Req and M2S RwD may be routed based on addresses (e.g., Case 1 1003), and M2S BIRsp may be routed based on BI-IDs (e.g., Case 2 1004).

[Process of Edge USP-M2S Req and M2S RwD (Case 1 1003)]

1. An edge USP (e.g., a second conversion module 732 that converts an HBR message to a PBR message) may read an M2S HBR message input to the edge USP and obtain an address.

2. The edge USP may obtain a port number of a target DSP from the address, based on an HDM decoder capability stored in an edge port controller 740A (refer to FIG. 10A). The edge USP may obtain a PBR ID from the port number of the target DSP, based on metadata 902A stored in a storage module 730A.

3. The obtained PBR ID may be set to a DPID. The edge USP (e.g., the second conversion module 732) may set its PBR ID to a SPID.

4. The edge USP may generate an M2S PBR message including the DPID and the SPID. The edge USP may transmit the M2S PBR message including the DPID and the SPID to a crossbar switch (e.g., the crossbar switch 350 of FIG. 6).

[Process of Edge USP-M2S BIRsp (Case 2 1004)]

1. An edge USP (e.g., a second conversion module 732 that converts an HBR message to a PBR message) may read an M2S HBR message input to the edge USP and obtain a BI-ID.

2. The edge USP may obtain a port number of a target DSP from the BI-ID, based on metadata 901A stored in a storage module 730A. The edge USP may obtain a PBR ID from the port number of the target DSP, based on metadata 902A stored in the storage module 730A.

3. The obtained PBR ID may be set to a DPID. The edge USP (e.g., the second conversion module 732) may set its PBR ID to a SPID.

4. The edge USP may generate an M2S PBR message including the DPID and the SPID. The edge USP may transmit the M2S PBR message including the DPID and the SPID to a crossbar switch (e.g., the crossbar switch 350 of FIG. 6).

[Process of Edge DSP (Case 1 (1003) and Case 2 (1004)]

1. An edge DSP (e.g., a first conversion module 731 that converts a PBR message to an HBR message) may obtain a SPID and a DPID from an M2S PBR message input to the edge DSP.

2-1. For security purposes, the edge DSP may check whether the obtained SPID is the same as a PBR ID of the edge USP stored in the edge DSP itself and may check whether the obtained DPID is the same as its own DPID (e.g., selectively) in step 850.

2-2. In Case 1 1004, for security purposes, the edge DSP may additionally obtain an address from the M2S PBR message. Based on an HDM decoder 905 stored in a storage module 730B, the edge DSP may check whether the obtained address is a routable address in step 862.

3. In a case in which an MLD is connected to the edge DSP, the edge DSP may obtain an LD-ID to be used as the SPID. Based on the obtained LD-ID, the edge DSP may generate an M2S HBR message (e.g., an M2S HBR message with the SPID and the DPID excluded). The M2S HBR message obtained by the completion of conversion may be transmitted to a DSP mux 722.

Hereinafter, contrary to what has been described above with reference to FIGS. 10B to 10D, FIGS. 10E to 10G show an operation of converting a message transmitted from a device (e.g., the device 200 of FIG. 5) (e.g., GFD device, a PCIe device, a CXL device, and an HBR switch) to a host server (hereinafter, a host) (e.g., the host 100 of FIG. 5). 20 FIG. 10E shows a conversion operation in the PCIe/CXL.io protocol. A TLP transmitted from a host may always head to a device, while a TLP transmitted from a device may head to a device according to a type thereof (e.g., P2P DMA). Therefore, an incoming HBR message input to an edge DSP may be routed to another edge DSP.

[Process on Message Generation Side]

1. An edge DSP (e.g., a second conversion module 732 that converts an HBR message to a PBR message) may read a header of a TLP to check a type and a format field of the TLP input to the edge DSP. An edge USP may determine whether the TLP belongs to Case 1 1005 or Case 2 1006.

2. In a case in which an MLD is connected to the edge DSP, the edge DSP may read an LD-ID TLP prefix 911 to obtain an LD-ID. The obtained LD-ID may be used to use metadata 900B, 901B, and 902B stored in a storage module 730B.

3-1. In Case 1 1005, the edge DSP may obtain an address from the TLP header. The edge DSP may obtain a port number of a target DSP from the address, based on a (prefetchable) memory window 900B. In the absence of the target DSP, the incoming TLP may be a TLP heading to a host.

3-2. In Case 2 1006, the edge DSP may obtain an ID from the TLP header. The edge DSP may obtain the port number of the target DSP from the ID, based on a bus window 901B. In the absence of the target DSP, the incoming TLP may be the TLP heading to the host.

4. The edge DSP may obtain a PBR ID from the port number of the target DSP, based on metadata 902B. The obtained PBR ID may be set to a DPID. In the absence of the target DSP, a PBR ID of the edge USP may be set to the DPID.

5. The edge DSP may generate a PTH 910C including the DPID and the SPID. The edge DSP may transmit a TLP with the PTH 910C appended to the foremost to a crossbar switch (e.g., the crossbar switch 350 of FIG. 6).

[Process on Message End Side]

1. An edge USP/DSP (e.g., a first conversion module 731 that converts a PBR message to an HBR message) may separate a PTH 910D from a TLP input to the edge USP/DSP. The PTH 910D may be substantially the same as the PTH 910C. The edge USP/DSP may obtain a SPID and a DPID from the PTH 910D.

2. For security purposes, the edge USP/DSP may check whether the obtained SPID is the same as a PBR ID of the edge DSP stored in the edge USP/DSP itself and may check whether the obtained DPID matches its own PBR ID (e.g., selectively) in step 851.

3-1. In Case 1 1005, the edge USP/DSP may obtain an address value from a TLP header input to the edge USP/DSP. The edge USP/DSP may check whether the obtained address value is included in a (prefetchable) memory window in step 865. If included, the edge USP/DSP may process the incoming TLP according to a PCI specification.

3-2. In Case 2 1006, the edge USP/DSP may obtain an ID value from the TLP header. The edge USP/DSP may check whether the obtained ID value is less than its own secondary bus number in step 866. Otherwise, the edge USP/DSP may process the incoming TLP according to the PCI specification.

4. A TLP for which the checking is completed (e.g., a TLP with the SPID and the DPID separated) may be transmitted to a USP mux 721.

Figure 10F:
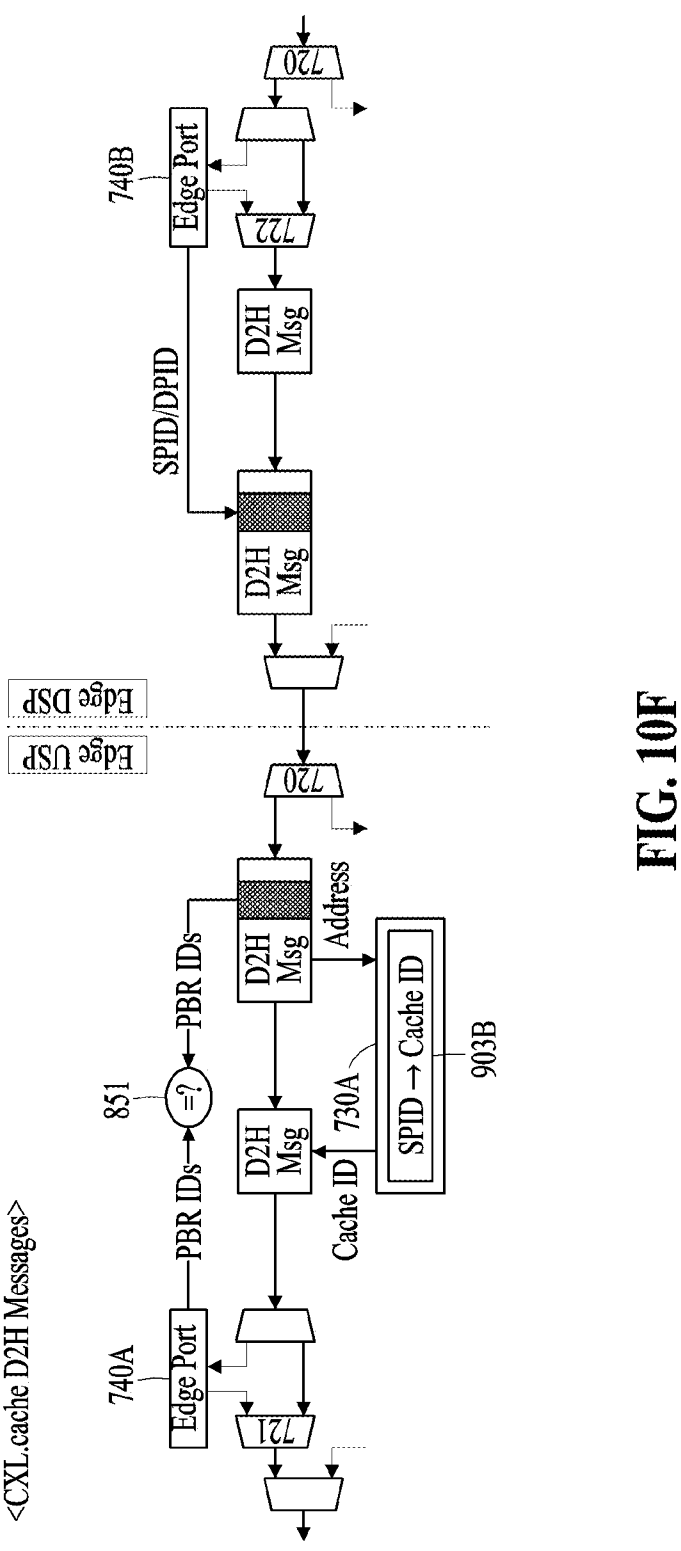

FIG. 10F shows a conversion operation in the CXL.cache protocol. D2H Req, D2H Resp, and D2H Data transmitted by a device may be transmitted only to a host. However, the host uses a CacheID included in D2H Req, and thus an edge port may need to manage CacheID values.

[Process of Edge DSP]

1. An edge DSP (e.g., a second conversion module 732 that converts an HBR message to a PBR message) may read a D2H HBR message and obtain a CacheID.

2. The edge DSP may obtain a PBR ID from the CacheID, based on metadata stored in an edge port controller 740A. The obtained PBR ID may be set to a DPID. The edge DSP may set its PBR ID as a SPID.

3. The edge DSP may generate a D2H PBR message including the DPID and the SPID. The edge DSP may transmit the D2H PBR message including the DPIP and the SPIP to a crossbar switch (e.g., the crossbar switch 350 of FIG. 6).

[Process of Edge USP]

1. An edge USP (e.g., a first conversion module 731 that converts a PBR message to an HBR message) may obtain a SPID and a DPID from a D2H PBR message input to the edge USP.

2. The edge USP may obtain a CacheID from the SPID based on metadata 903B stored in a storage module 730B.

3. For security purposes, the edge USP may check whether the obtained SPID is the same as a PBR ID of the edge USP stored in the edge USP itself and may check whether the obtained DPID is the same as its PBR ID (e.g., selectively) in step 851.

4. The edge USP may generate a D2H HBR message (e.g., a D2H HBR message with the SPID and the DPID excluded) including the CacheID value. The generated D2H HBR message may be transmitted to a USP mux 721.

Figure 10G:
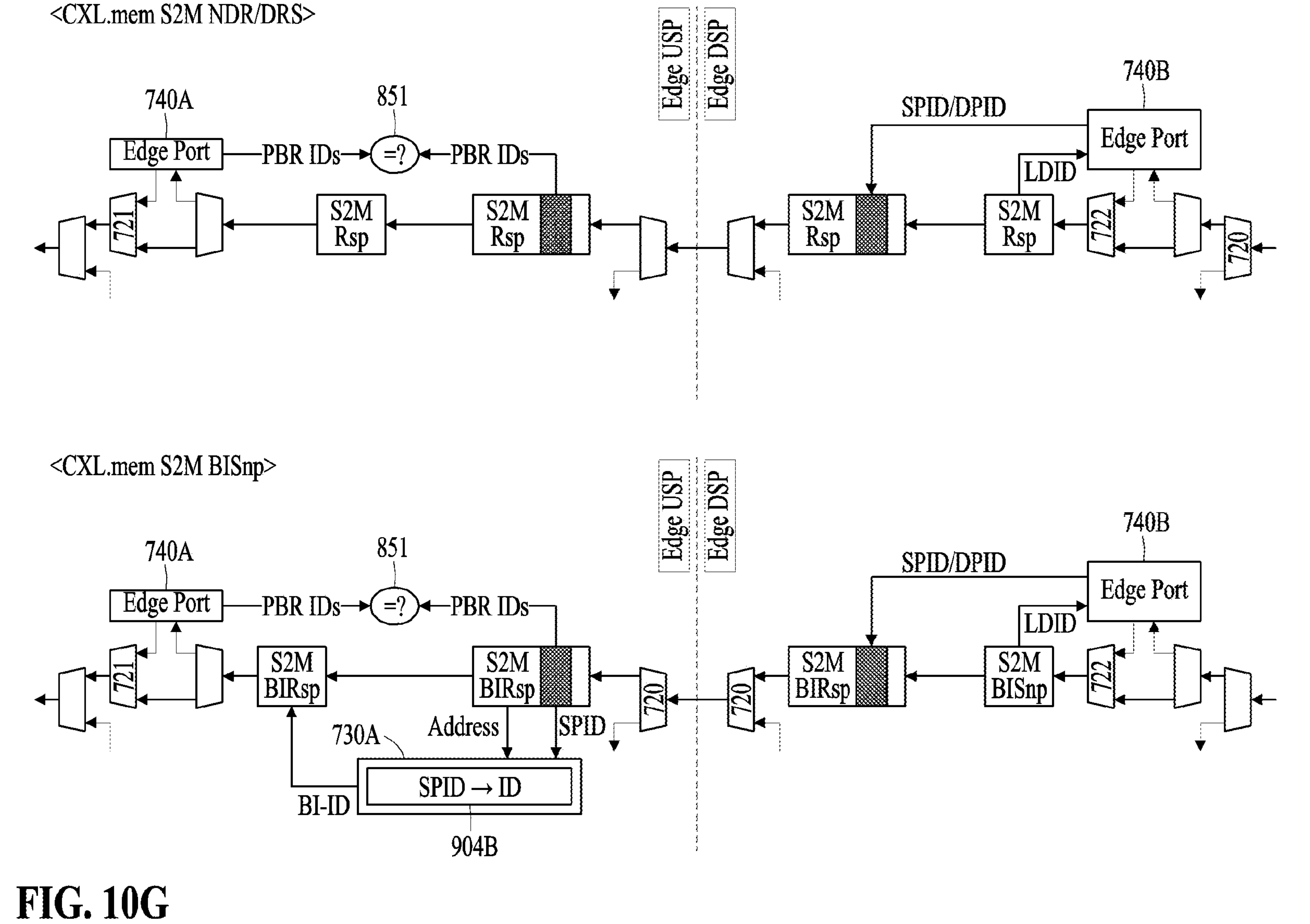

FIG. 10G shows an example process of converting an HBR message (e.g., S2M NDR, S2M DRS, and S2M BIReq) transmitted from a device (e.g., the device 200 of FIG. 5) (e.g., a GFD, a PCIe device, a CXL device, and an HBR switch) to a host server (hereinafter, a host) (e.g., the host 100 of FIG. 5), in the CXL.mem protocol. The HBR message (e.g., S2M NDR, S2M DRS, and S2M BIReq) transmitted from the device to the host may be necessarily transmitted only to the host. However, the host uses a BI-ID included in S2M BIReq, an edge port may need to manage BI-ID values.

[Process of Edge DSP]

1. In a case in which an MLD is connected to an edge DSP, the edge DSP may obtain an LD-ID from an S2M HBR message input to the edge DSP. The LD-ID may be used as a SPID.

2. The edge DSP may generate an S2M PBR message using the S2M HBR message input to the edge DSP, a PBR ID of an edge USP (i.e., a SPID), and its own PBR ID (i.e., a DPID). The edge DSP may transmit the S2M PBR message including the DPID and the SPID to a crossbar switch (e.g., the crossbar switch 350 of FIG. 6).

in [Process of Edge USP]

1. An edge USP may obtain a SPID and a DPID from an S2M PBR message input to the edge USP.

2. The edge USP may obtain a BI-ID from the SPID based on metadata 904B stored in a storage module 730A.

3. For security purposes, the edge USP may check whether the obtained SPID is the same as a PBR ID of the edge USP stored in the edge USP itself and may check whether the obtained DPID is the same as its own DPID (e.g., selectively) in step 851.

4. The edge USP may generate an S2M HBR message using the S2M PBR message (e.g., an S2M PBR message with the SPID and the DPID excluded) and the BI-ID. The edge USP may transmit the S2M HBR message to a USP mux 721.

Figure 10H:
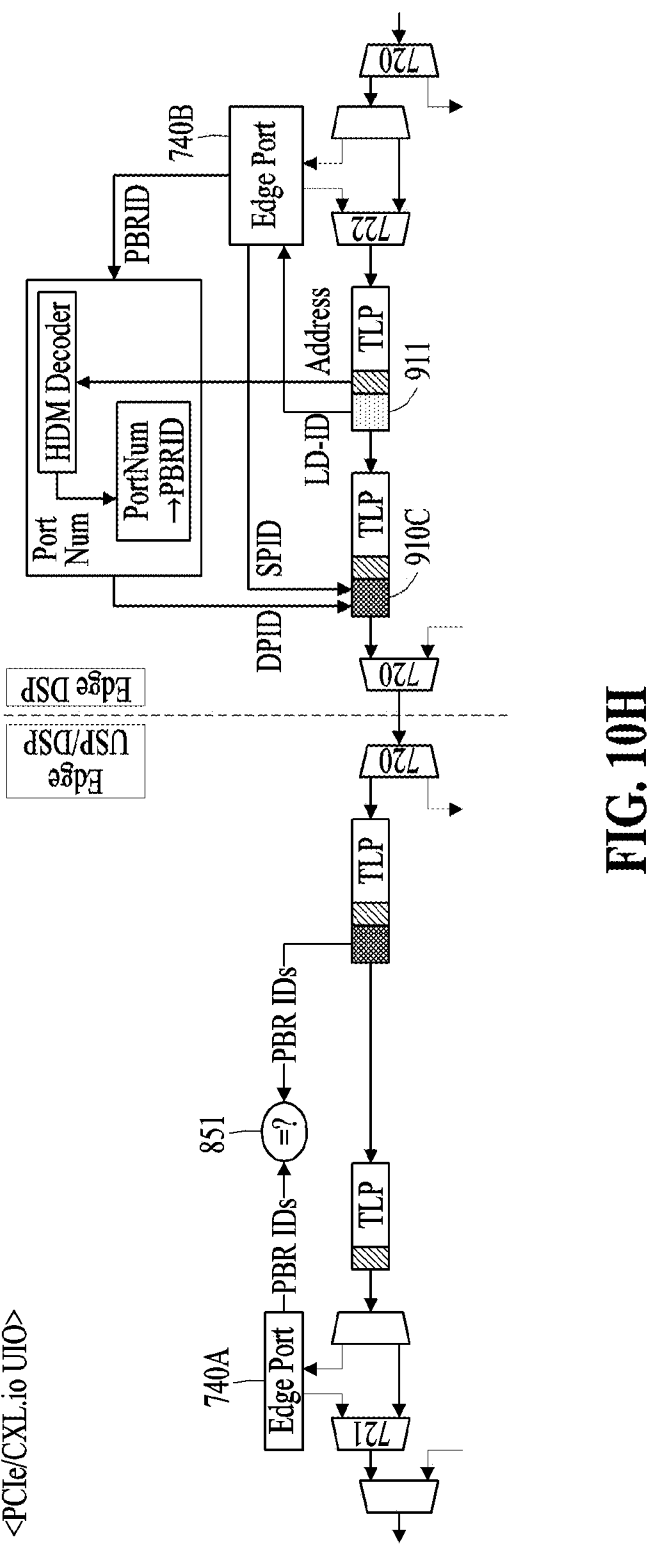

FIG. 10H shows an example process of converting an unordered IO (UIO) TLP transmitted from a device (e.g., the device 200 of FIG. 5) (e.g., a GFD, a PCIe device, a CXL device, and an HBR switch) to a host server (hereinafter, a host) (e.g., the host 100 of FIG. 5), in the PCIe/CXL.io UIO protocol.

A UIO function is scheduled to be added to the PCIe protocol. The UIO function may be a feature that allows an accelerator device (e.g., a CXL Type 1 or 2 device) to access a host-managed device memory (HDM) (e.g., in a CXL Type 2 or 3 device, an address space when the memory space inside the device is mapped to an address space of the host) of a memory device (e.g., a CXL Type 3 device or GFD), without going through the host, (e.g., differentiated as HDM-D (HDM device coherent), HDM-DB (HDM device coherent using back-invalidation), and HDM-H based on the extent and manner in which cache coherency is maintained). The UIO TLP may be transmitted to an edge USP or an edge DSP in some cases.

[Process on Message Generation Side]

1. An edge DSP may check a type by reading a header of a TLP input to the edge DSP. The edge DSP may determine that the incoming TLP is a UIO.

2. In a case in which an MLD is connected to the edge DSP, the edge DSP may obtain an LD-ID by reading an LD-ID TLP prefix 911. The LD-ID may be used to use metadata (e.g., 902B and 905 of FIG. 10A).

3. The edge DSP may obtain a port number of a target DSP/USP based on an HDM decoder (e.g., the metadata 905 of FIG. 10A). The edge DSP may obtain a PBR ID from the port number of the target DSP/USP, based on the metadata 902B.

4. The obtained PBR ID may be set to a DPID. The edge DSP may set its own PBR ID as a SPID.

5. The edge DSP may generate a PTH 910C including the DPID and the SPID and transmit a TLP including the PTH 910C to a crossbar switch (e.g., the crossbar switch 350 of FIG. 6).

[Process on Message End Side]

1. An edge USP/DSP may separate a PTH from a TLP input to the edge USP/DSP. The edge USP/DSP may obtain a SPID and a DPID from the PTH.

2. For security purposes, the edge USP/DSP may check whether the obtained SPID is the same as a PBR ID of an edge DSP stored in the edge USP/DSP itself and may check whether the obtained DPID matches its own PBR ID (e.g., selectively) in step 851.

3. The edge USP/DSP may transmit the TLP with the PTH separated to a mux.

FIG. 10I shows a message format exchanged between a fabric manager (e.g., the fabric manager 600) and a PBR switch (e.g., 300) when routing information is updated. When a PCI configuration space or a CXL register within an edge port (e.g., 700) is updated, the PBR switch 300 may need to share new routing information with all edge ports (or other PBR switches) constituting a virtual switch. The PBR switch 300 may transmit the updated routing information to the fabric manager 600. Based on virtual switch information stored in the fabric manager 600 itself, the fabric manager 600 may determine a PBR switch (and/or port) that is to transmit the updated routing information (e.g., the routing information received from the PBR switch 300). The fabric manager 600 may transmit the updated routing information to the determined PBR switch and/or port.

Figure 10J:
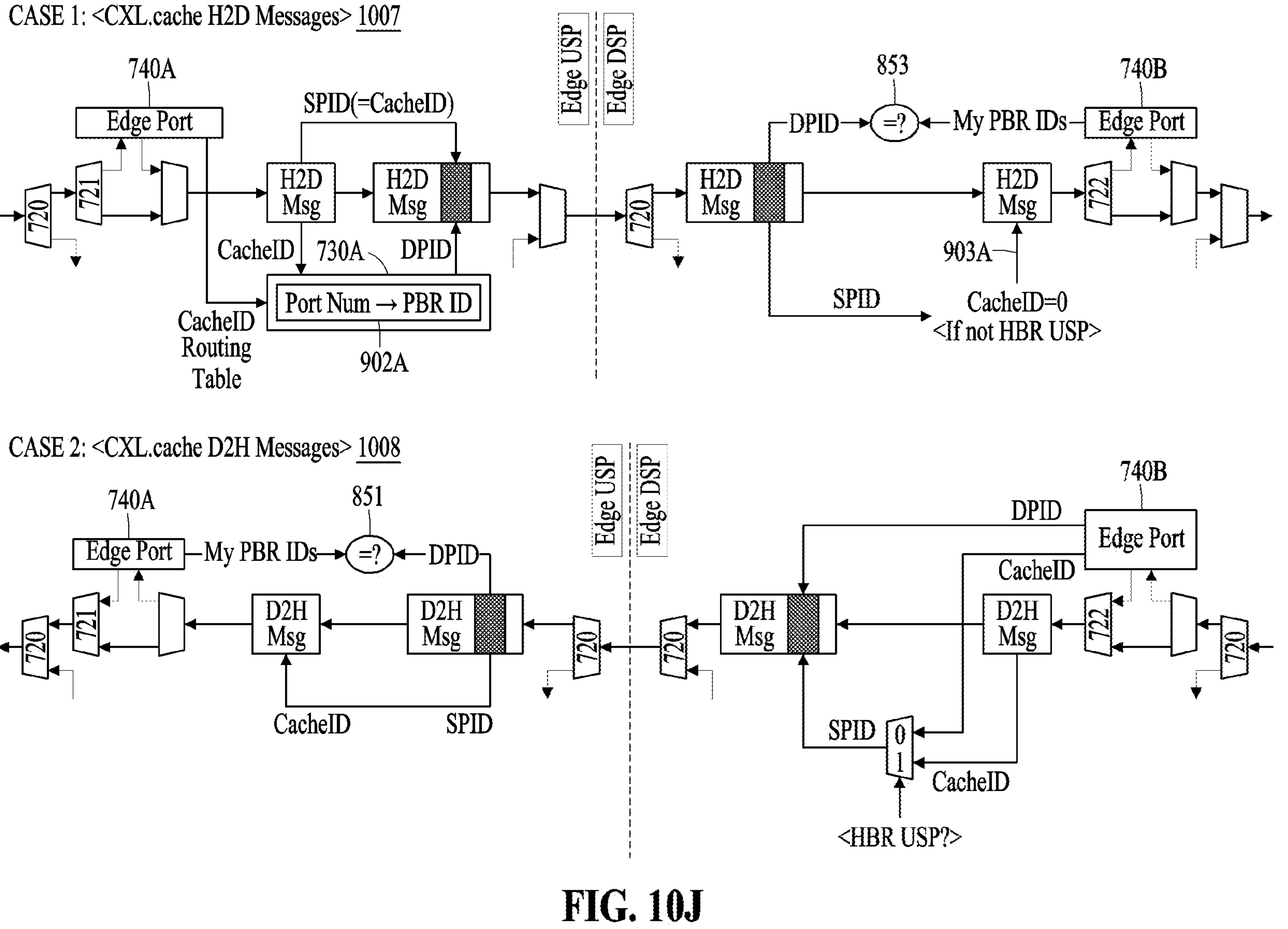
Figure 10K:
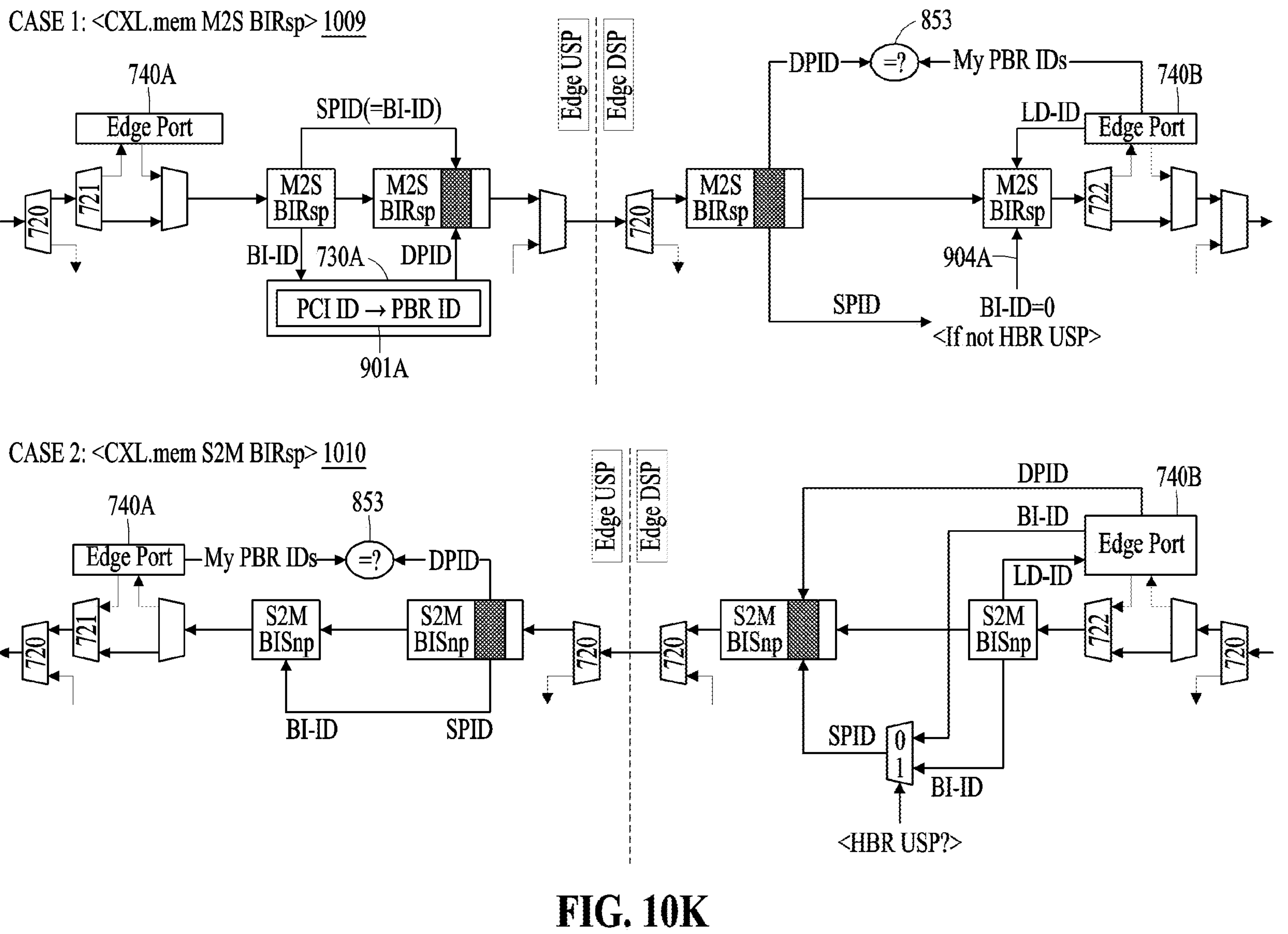

FIGS. 10J and 10K are diagrams illustrating a method of reducing the size (or the number) of metadata used for a conversion between HBR and PBR messages.

As described above with reference to FIG. 10C and others, multiple CacheIDs and BI-IDs may be mapped to a single PBR ID, and thus they may not be processed correctly when an HBR switch is connected to an edge DSP. A possible solution to this issue may be to assign different PBR IDs to all DSPs in the HBR switch and sub-switches and allow the edge DSP to manage them. However, because the size of metadata that needs to be stored per PBR ID is not small, as more PBR IDs are assigned (or used), the physical size of a storage module (or edge port controller) that stores the metadata may increase. The following describes a method of including a CacheID or BI-ID, instead of a SPID, in a PBR message obtained by a conversion by a port.

Referring to FIG. 10J, in a case in which a CXL.cache H2D message is transmitted from a host to a device (e.g., Case 1 1007), an edge USP may use a CacheID value included in the message as a SPID. The CacheID may be 4 bits and stored in a 12-bit SPID field. An edge DSP that receives the H2D message with the CacheID stored in the SPID field may use a value stored in the SPID field as a CacheID value. When a device mounted on the edge DSP is a CXL Type 1/2 device, rather than an HBR USP, zero (0) may be written as the CacheID value (e.g., the CXL Type 1/2 device may not use this field).

When the device transmits a CXL.cache D2H message to the host (e.g., Case 2 1008), the edge DSP may use a CacheID included in the D2H message (e.g., when the device is an HBR USP) or a CacheID stored in its CXL CacheID decoder (e.g., when the device is a CXL Type 1/2 device) as a SPID. The edge USP that receives an H2D message with a CacheID stored in a SPID field may use a value stored in the SPID field as the CacheID value.

Referring to FIG. 10K, in a case in which a host transmits a CXL.mem M2S BIRsp to a device (e.g., Case 1 1009), an edge USP may use a BI-ID value included in the message as a SPID. The BI-ID may be 12 bits and stored in a 12-bit SPID field. An edge DSP that receives the M2S message with the BI-ID stored in the SPID field may use a value stored in the SPID field as the BI-ID value. When a device mounted on the edge DSP is a CXL Type 2/3 device rather than an HBR USP, zero (0) may be written as the BI-ID value (e.g., the CXL Type 2/3 device may not use this field).

When the device transmits a CXL.mem S2M BISnp to the host (e.g., Case 2 1010), the edge DSP may use, as a SPID, a BI-ID (e.g., when the device is an HBR USP) included in the S2M message or a BI-ID (e.g., when the device is a CXL Type 2/3 device) stored in its CXL BI-ID decoder. The edge USP that receives the S2M message with the BI-ID stored in the SPID field may use a value stored in the SPID field as the BI-ID value.

For reference, it should be noted that, in a case in which, in future CXL protocols, an edge DSP and an HBR USP in a CXL fabric are defined to be unconnectable (i.e., a PBR switch and an HBR switch are never connected), (i) no new bits may need to be added to modified TS1/TS2 ordered sets, and (ii) the edge DSP may not need to secure a metadata space for all potentially present HBR DSPs.

FIGS. 11A through 11I are diagrams illustrating a structure and an operation of a CXL switch configured to perform cache coherency management according to an embodiment.

According to an embodiment, a set of CXL switches (e.g., a CXL fabric) may form a cache-coherent network. According to an embodiment, a CXL switch, instead of a cache-coherent DSM (or CC DSM), may be an entity that is responsible for managing cache coherency between host servers.

However, not all the CXL switches included in the CXL fabric may manage cache coherency. Among the CXL switches, only those CXL switches using all different ports to transmit snoop requests to an arbitrary host server (hereafter, a host) may participate in such cache coherency management.

Figure 11A:
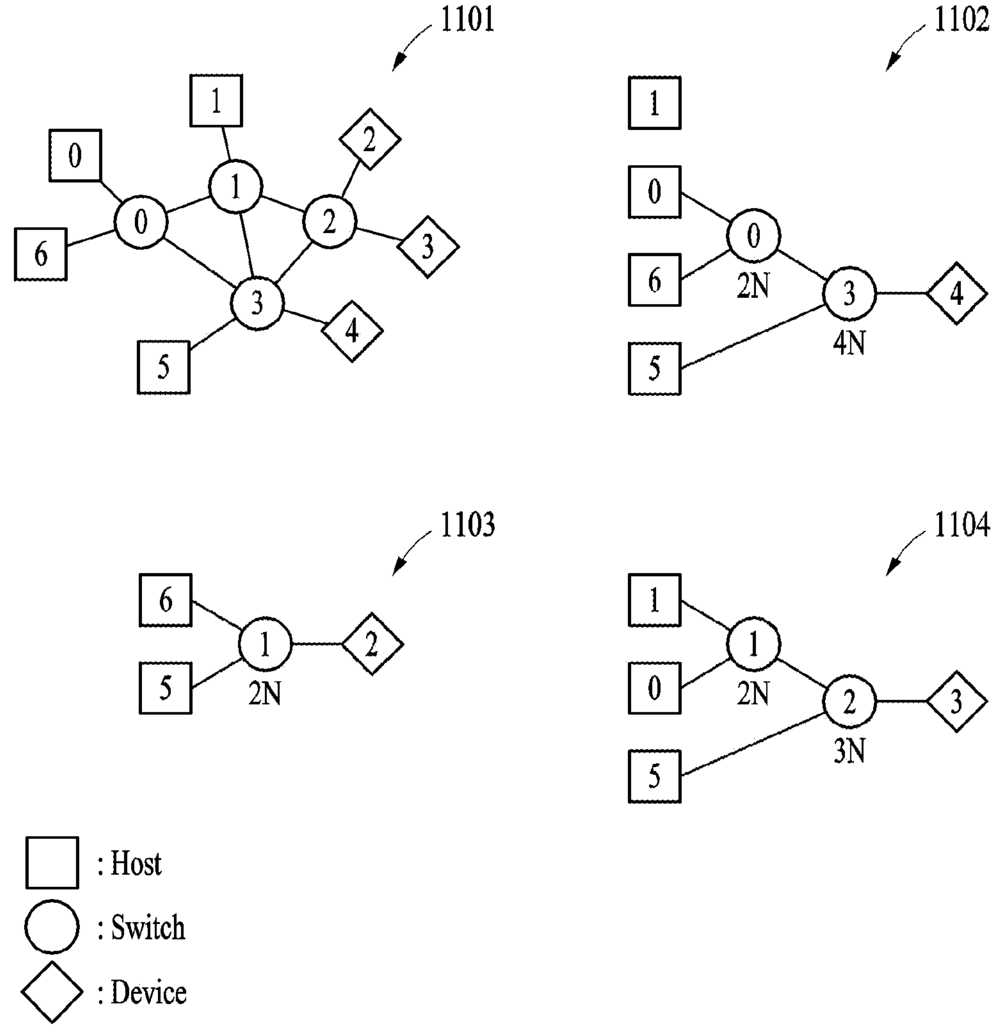

FIG. 11A shows an example of a CXL fabric connecting hosts and devices (e.g., GFDs, PCIe devices, CXL devices, and HBR switches) and a CXL switch participating in cache coherency management.

Block diagram 1101 shows a host, a CXL fabric, and a device. Block diagram 1102 shows CXL switches (e.g., switch 0 and switch 3) participating in cache coherency management for hosts (e.g., host 1, host 0, host 6, and host 5) that use (e.g., assign) device 4 together. The numbers indicated along with the switches (e.g., 2N and 4N) may represent the number of cache line data managed by the respective switches. The switch 0 connected to two hosts may store 2N cache line data. The switch 3 connected to four hosts may store 4N cache line data.

Block diagram 1103 shows a CXL switch 1 participating in cache coherency management for hosts (e.g., host 6 and host 5) that use (e.g., assign) device 2 together. Block diagram 1104 shows CXL switches (e.g., switch 1 and switch 2) participating in cache coherency management for hosts (e.g., host 1, host 0, and host 5) that use (e.g., assign) device 3 together.

Figure 11B:
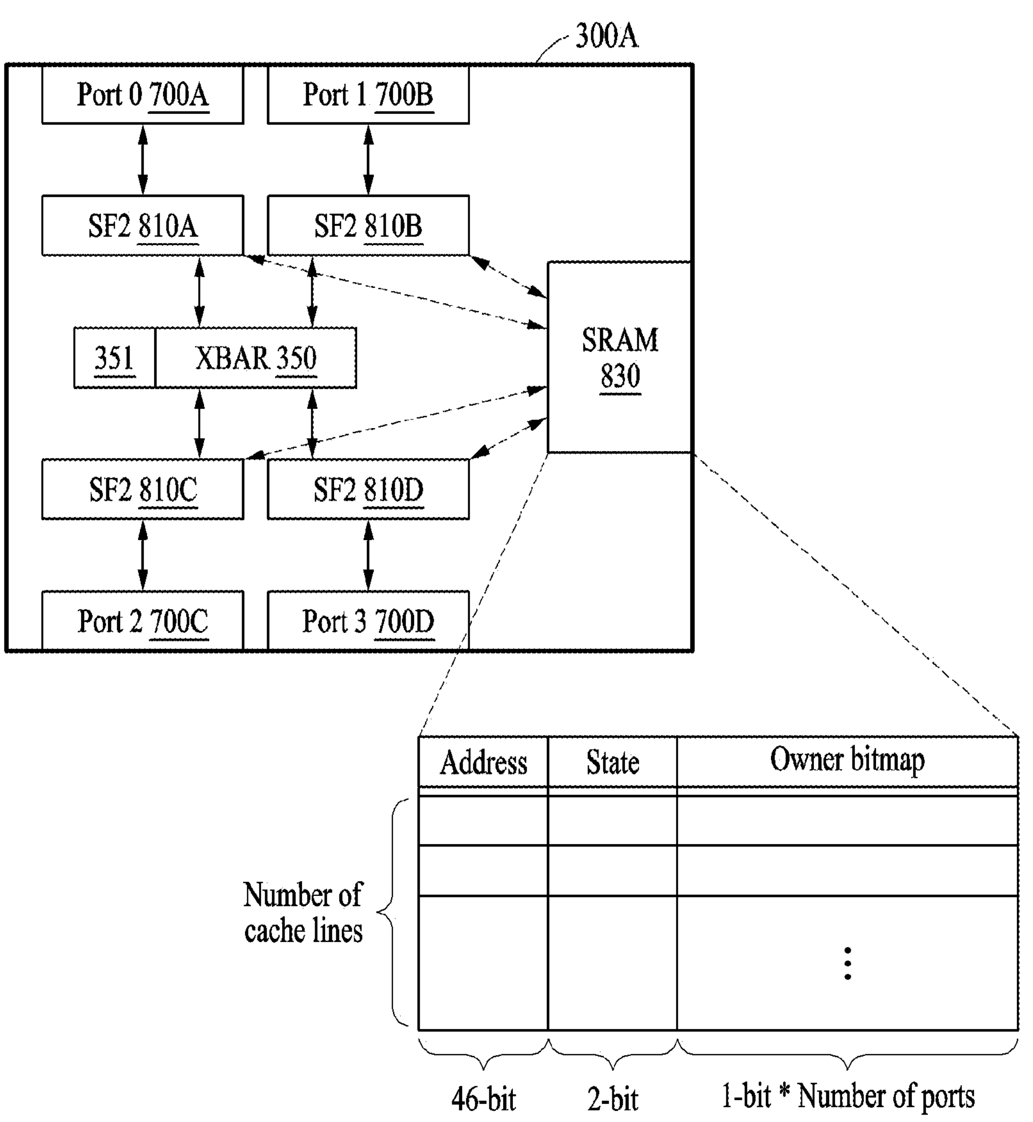

FIG. 11B shows a block diagram of a CXL switch 300A that may perform cache coherency management. The CXL switch 300A may be implemented based on a PBR switch. The CXL switch 300A may include ports 700A, 700B, 700C, and 700D, snoop filters (or indicated as SFs) 810A, 810B, 810C, and 810D, and an SRAM 830. The CXL switch 300A may further include a crossbar switch 350 and a routing table 351.

The ports 700A, 700B, 700C, and 700D may function as an USP, a DSP, or an FP.

The snoop filters 810A, 810B, 810C, and 810D may be connected to the ports 700A, 700B, 700C, and 700D, respectively, to perform cache coherency management between host servers sharing a specific device. The snoop filters 810A, 810B, 810C, and 810D may share the SRAM 830.

The SRAM 830 may store states and owner information (e.g., owner bitmap) of cache line data that are used by the snoop filters 810A, 810B, 810C, and 810D for cache coherency management. The size of the owner information may be calculated based on the number of ports, rather than a total number of host servers. The size of the owner information may be calculated based on a total number (e.g., 4) of the ports 700A, 700B, 700C, and 700D included in the CXL switch 300A.

The crossbar switch 350 and the routing table 351 may be substantially the same as the crossbar switch 350 and the routing table 351 described above with reference to FIG. 6, and thus a more detailed description thereof is omitted here for brevity.

Figure 11C:
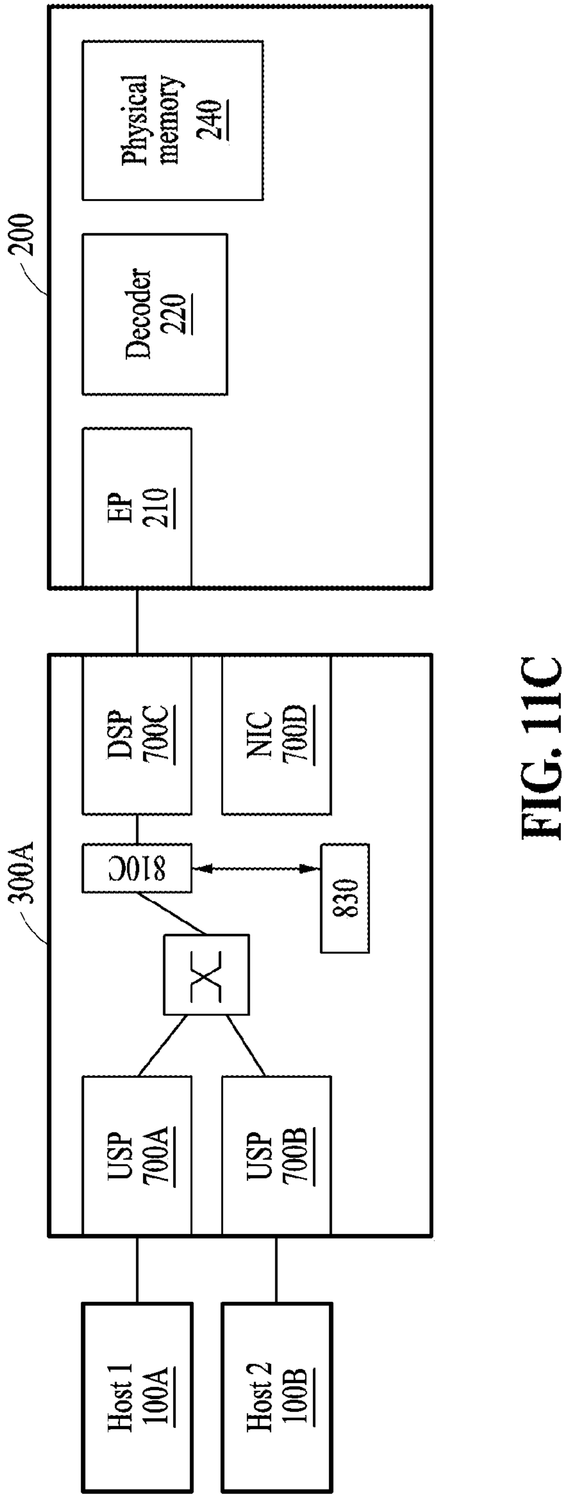
Figure 11D:
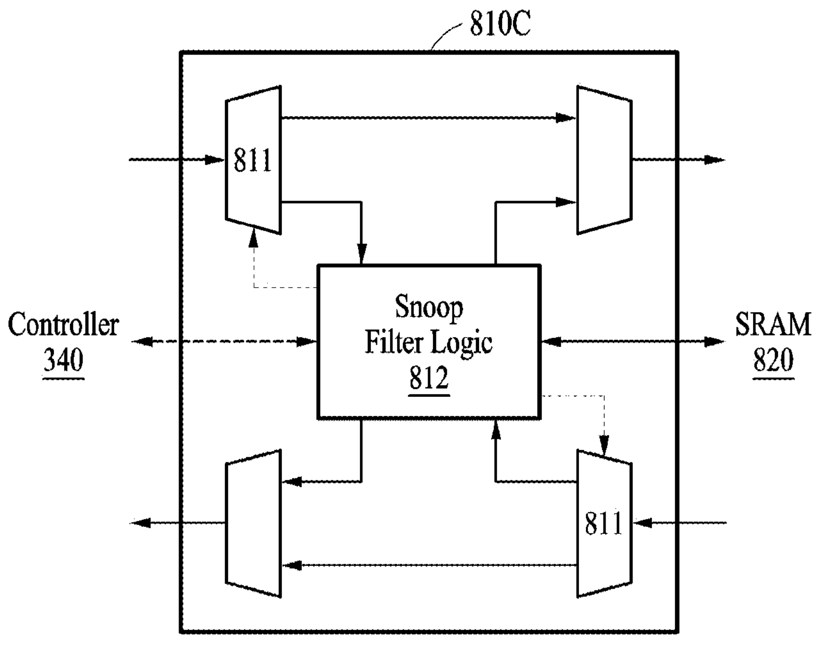
Figure 11D:
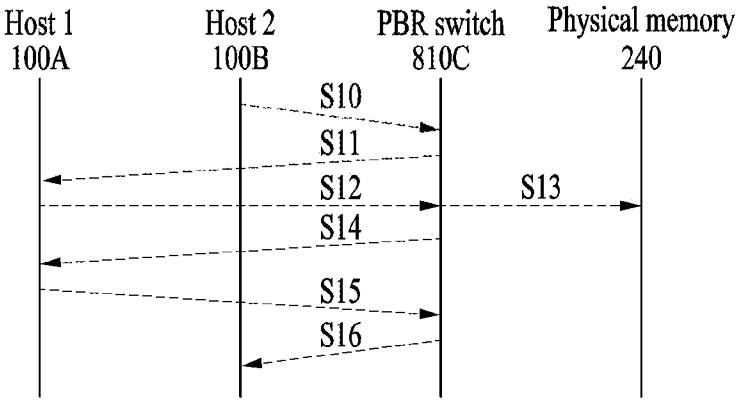

FIGS. 11C and 11D show a structure and operations of a snoop filter 810C that manages cache coherency between a host 1 100A and a host 2 100B. The hosts 100A and 100B may be connected to ports 700A and 700B, respectively, and a device 200 may be connected to a port 700C. The remaining snoop filters 810A, 810B, and 810D, excluding the snoop filter 810C, may be deactivated.

The snoop filter 810C may manage cache coherency between the hosts 100A and 100B based on a SPID and a DPID included in a PBR flit that reaches itself. The snoop filter 810C may check the SPID and the DPID included in the PBR flit that reaches itself to determine whether messages are messages from hosts (and/or devices) for which cache coherency management is performed by itself.

The snoop filter 810C may include a mux 811 and a snoop filter logic 812. In a case in which a SPID/DPID included in an incoming message do not match a SPID/DPID stored in the mux 811, the mux 811 may export the message without processing the message. In a case in which the SPID/DPID included in the incoming message match the SPID/DPID stored in the mux 811, the mux 811 may transmit the message to the snoop filter logic 812 that performs cache coherency management.

As described above, a cache coherency protocol may be processed through the CXL switch 300A, and a cache-coherent message may not need to be transmitted to a device. Accordingly, even when general CXL Type 3 memory devices that do not support back-invalidation are assigned to hosts, cache coherency between the hosts may still be managed through the CXL switch 300A. In addition, a cache-coherent message is not transmitted up to the device, and thus the time used to transmit each message may be reduced in half.

Figure 11E:
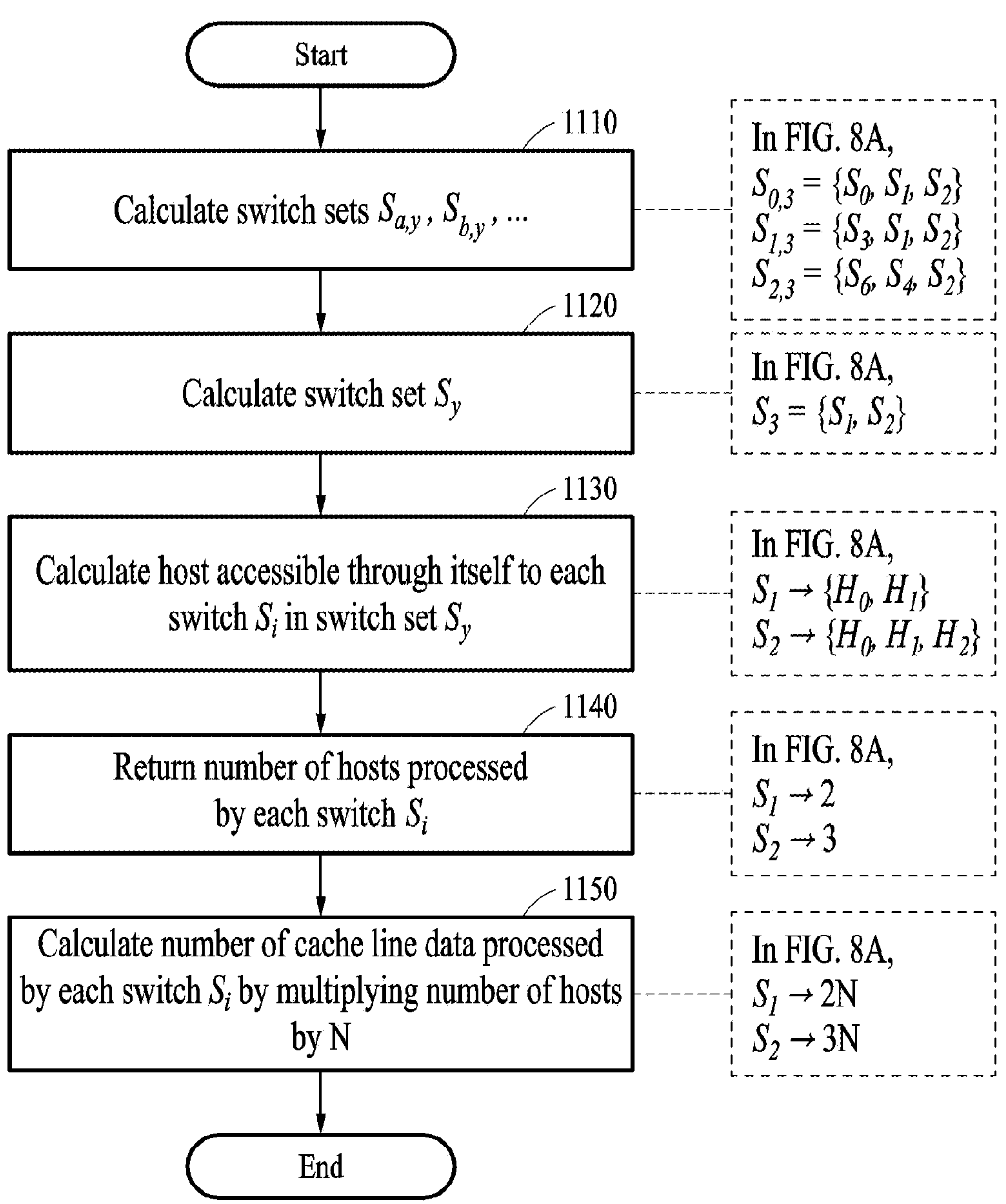

Referring to FIG. 11E, a fabric manager (e.g., 600) may calculate the number of cache line data (e.g., the size of an SRAM) processed by a CXL switch (e.g., 300A). It should be noted that the results juxtaposed with the flowchart in FIG. 11E refer to what has been described above with reference to FIG. 8A.

In operation 1110, the fabric manager 600 may calculate (e.g., determine), for each of N different hosts $H_a$, $H_b$, . . . that use the same device $D_y$, switch sets $S_{a,y}$, $S_{b,y}$, . . . present respectively on routing paths $P_{a,y}$, $P_{b,y}$, . . . .

In operation 1120, the fabric manager 600 may calculate a switch set $S_y$. The switch set $S_y$ may be a set of switches, excluding switches that transmit snoops only to a single host among the hosts $H_a$, $H_b$, . . . that use the same device $D_y$ from a switch set $\{S_{a,y} \cup S_{b,y} \cup \ldots\}$.

In operations 1130 and 1140, the fabric manager 600 may calculate hosts (and the number of the hosts) on which cache coherency management is performed, for each CXL switch $S_i$ included in the switch set $S_y$.

In operation 1150, the fabric manager 600 may calculate the number of cache line data processed by each CXL switch $S_i$ by multiplying the number of hosts by N. In this case, N may be calculated based on a sum of the remaining capacities of all SRAMs (e.g., 300) included in a cache-coherent network.

When a value of N is small, the number of cache line data that a host may be able to store may be reduced, and the performance may thus be reduced. However, for connecting an arbitrary device (e.g., $D_y$) and all hosts using this device, not all the necessary hosts may not participate in cache coherency management, and an SRAM (e.g., 830) usage of each switch may thus be minimized. Also, when the value of N is extremely small, network settings may be changed to allow routing paths to be reset and CXL switches with lower SRAM (e.g., 830) usage to participate in cache coherency management. The CXL switches (e.g., 300A) that manage cache coherency may be represented as a multi-level cache layer.

Figure 11F:
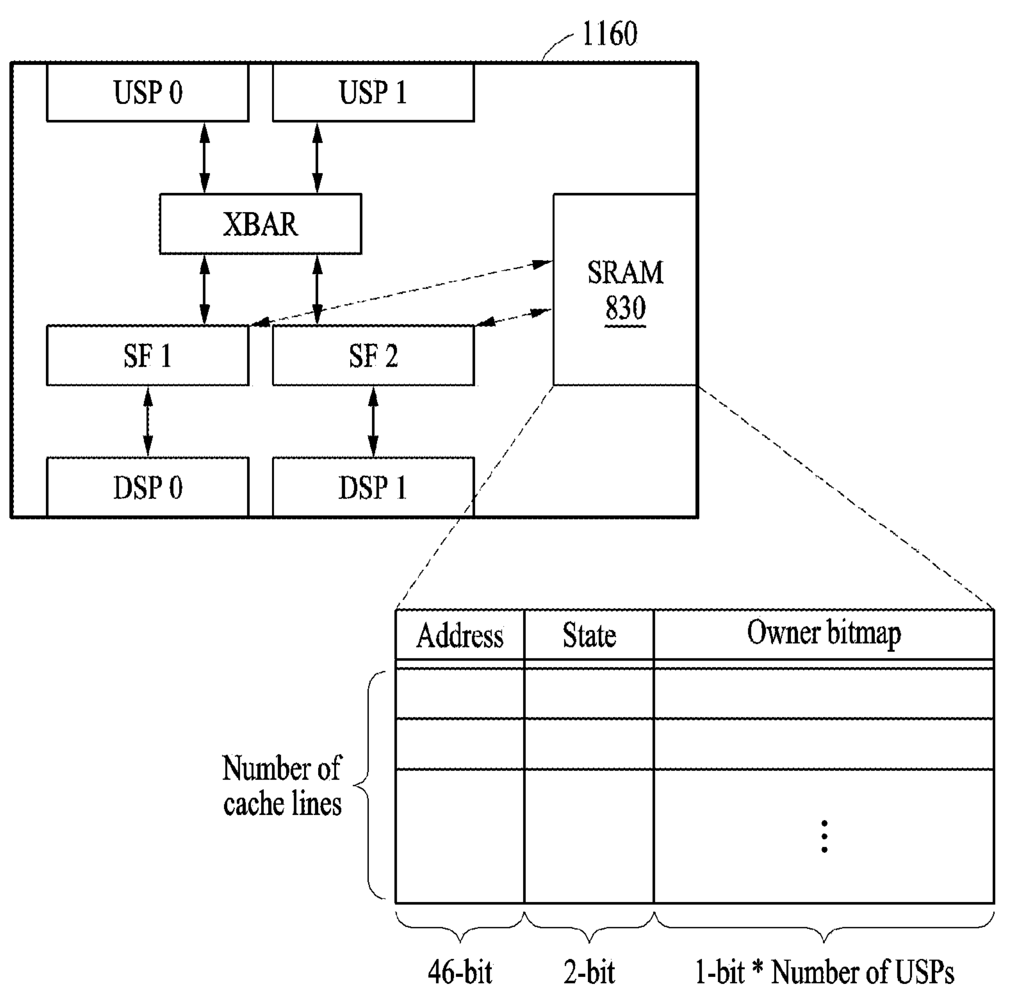

FIG. 11F shows a block diagram of a CXL switch 1160 that may perform cache coherency management. The CXL switch 1160 may be implemented based on an HBR switch.

The CXL switch 1160 may include ports (USP 0, USP 1, DSP 0, and DSP 1), snoop filters (SF 1 and SF 2), and an SRAM 830. The CXL switch 1160 may further include a crossbar switch (e.g., 350).

The ports USP 0, USP 1, DSP 0, and DSP 1 may include two USPs and two DSPs.

The snoop filters SF 1 and SF 2 may be connected respectively to DSP 0 and DSP 1 to perform cache coherency management between host servers sharing a specific device. The snoop filters SF 1 and SF 2 may share the SRAM 830.

The SRAM 830 may store states and owner information (e.g., owner bitmap) of cache line data that are used by the snoop filters SF1 and SF2 for cache coherency management. The size of the owner information may be calculated based on a total number (e.g., 2) of USPs (e.g., USP 0 and USP 1) included in the CXL switch 1160, and in this case, for example, a host may be connected only to a USP.

The operations of the CXL switch 1160 may be similar to the operations of the CXL switch 300A. The operations of the CXL switch 1160 may be substantially the same as the operations of the CXL switch 300A, except that it uses HBR messages rather than PBR messages and uses LD-IDs rather than PBR IDs to identify hosts, and thus a more detailed description thereof will be omitted here for brevity.

Figure 11G:
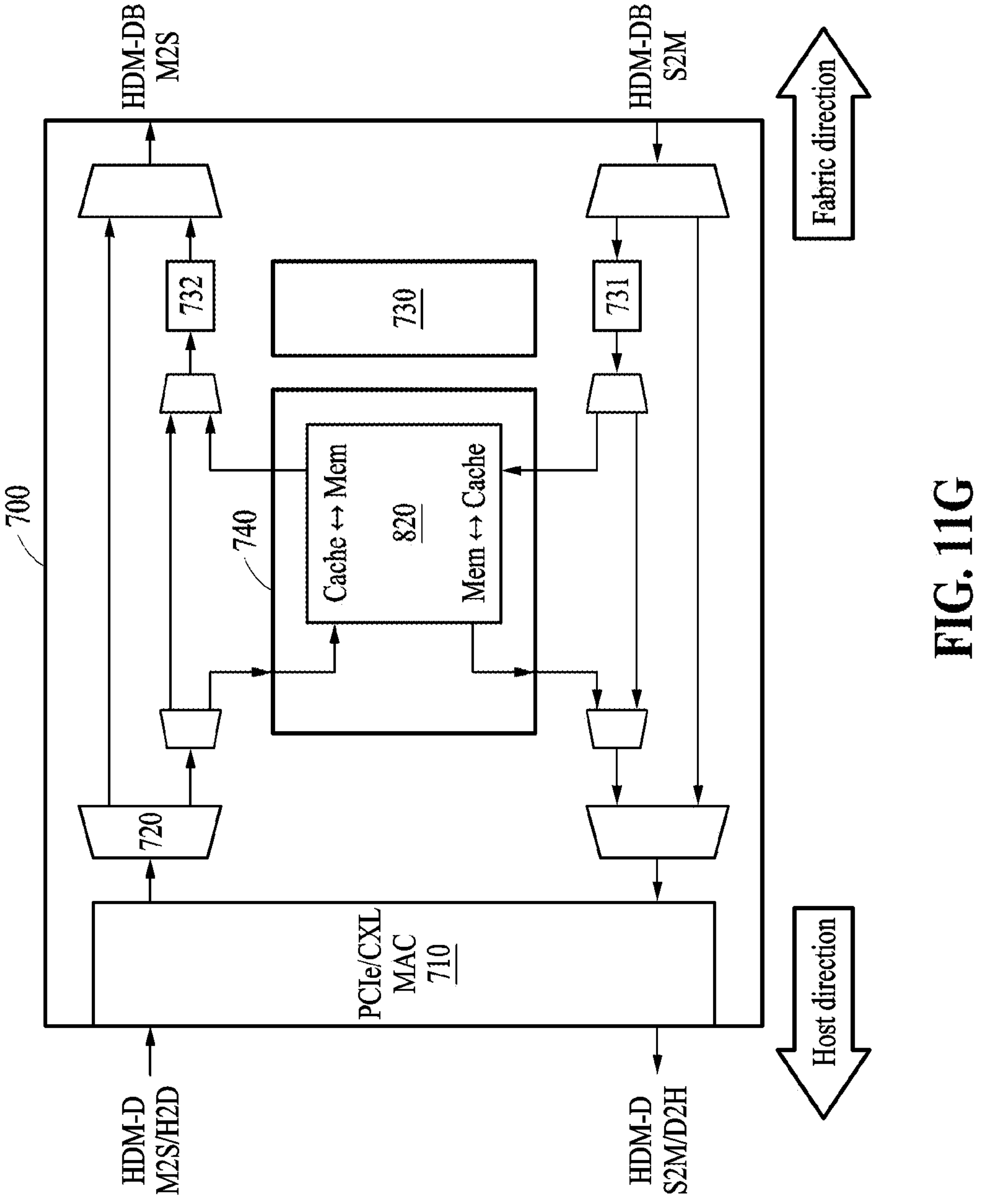
Figure 11H:
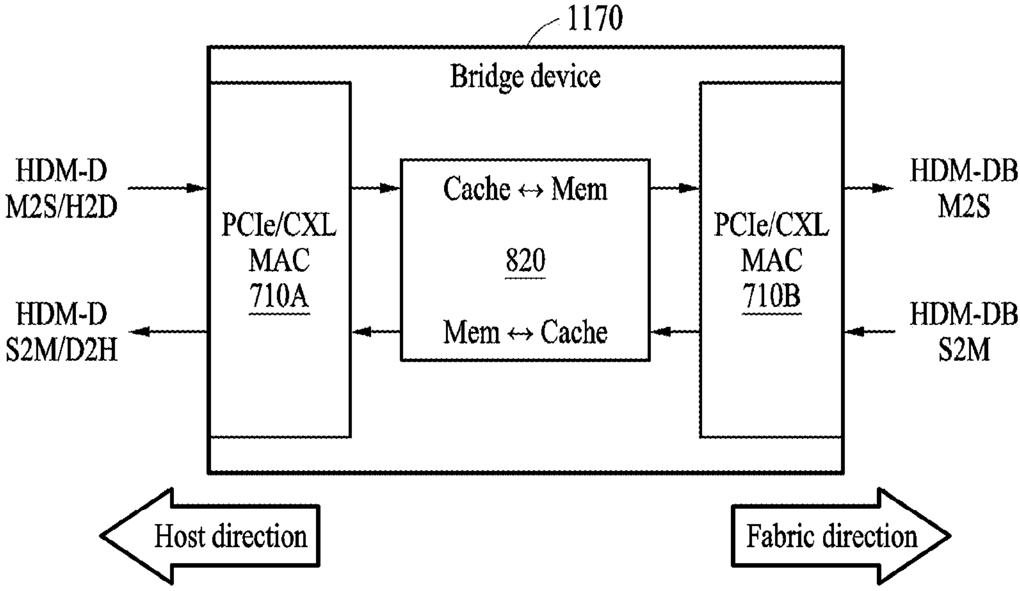

FIGS. 11G and 11H show block diagrams of a protocol conversion module 820 for cache coherency management for hosts (e.g., host servers) that do not support a back-invalidation operation. The protocol conversion module 820 may be implemented within an edge port controller 740 as shown in FIG. 11G, or the protocol conversion module 820 may be implemented within a separate hardware device (e.g., a bridge device 1170) as shown in FIG. 11H.

Referring to FIG. 11G, a USP including the protocol conversion module 820 may be connected to a host that does not support the back-invalidation operation. The host that does not support the back-invalidation operation may recognize the protocol conversion module 820 as a CXL Type 2 device. Thus, the host that does not support the back-invalidation operation may map a memory space of the protocol conversion module 820 to an HDM-D. The host that does not support the back-invalidation operation may use both the CXL.cache and CXL.mem protocols to access the memory space of the protocol conversion module 820 to manage cache coherency.

A DSP including the protocol conversion module 820 may be connected to a CXL fabric. The protocol conversion module 820 included in the DSP may convert a request transmitted from the host (e.g., the host that does not support the back-invalidation operation) to conform to the CXL.mem protocol.

Referring to FIG. 11H, the bridge device 1170 including the protocol conversion module 820 may connect elements that do not support back-invalidation (e.g., CXL 1.1/2.0 hosts and CXL 3.0 hosts) and elements that support back-invalidation (e.g., switches and devices).

A host that does not support the back-invalidation operation may recognize the protocol conversion module 820 as a CXL Type 2 device. A DSP (e.g., 710B) of the protocol conversion module 820 may operate as a root port and be connected to an HBR/PBR switch or Type 3 device that supports back-invalidation.

FIG. 11I shows a mapping table between a host-managed device memory-D (HDM-D) and a host-managed device memory-DB (HDM-DB). D and DB may be short for device-coherent for D and device-coherent using back-invalidation snoop for DB. The protocol conversion module 820 may use the mapping table shown in FIG. 11I to support cache coherency management for host servers that do not support the back-invalidation operation.

Figure 12A:
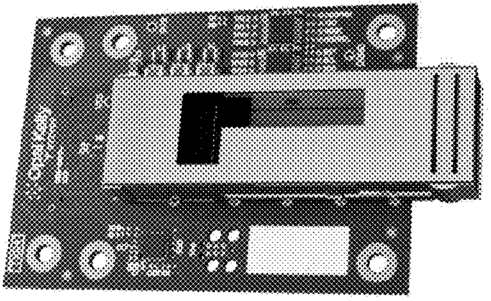
FIGS. 12A through 12C are diagrams illustrating an inter-port physical connection according to an embodiment.
Figure 12A:
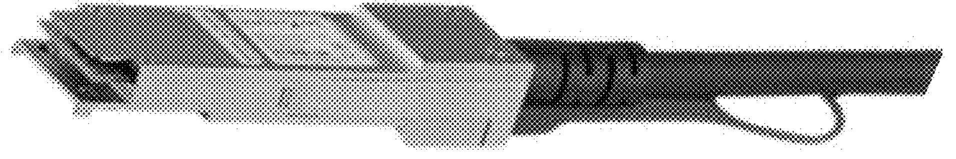
Figure 12B:
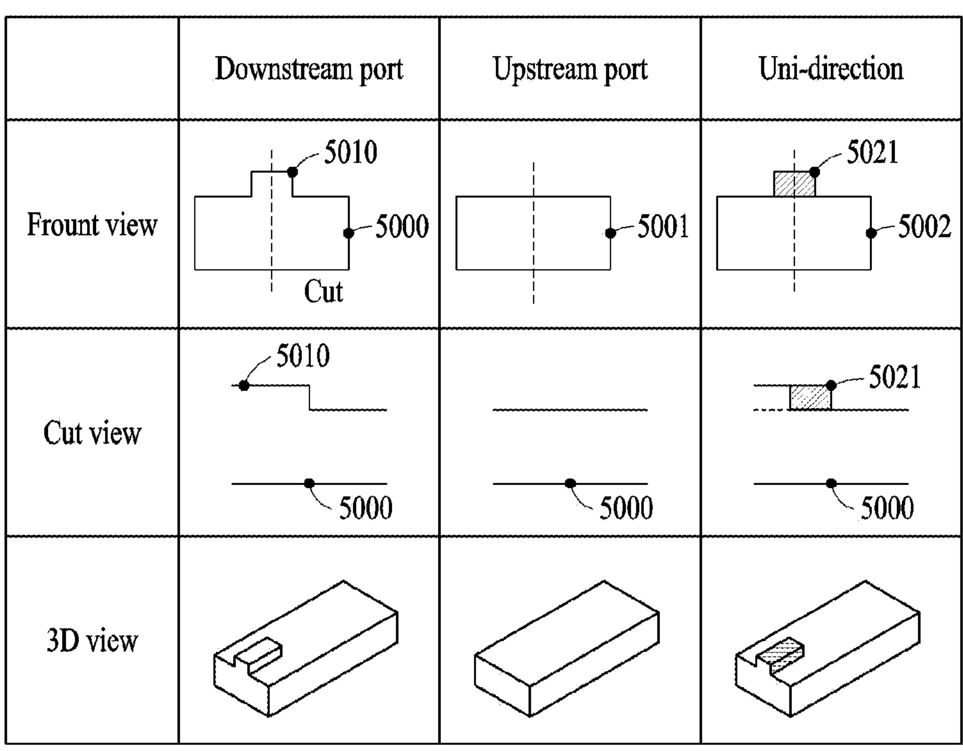
Figure 12C:
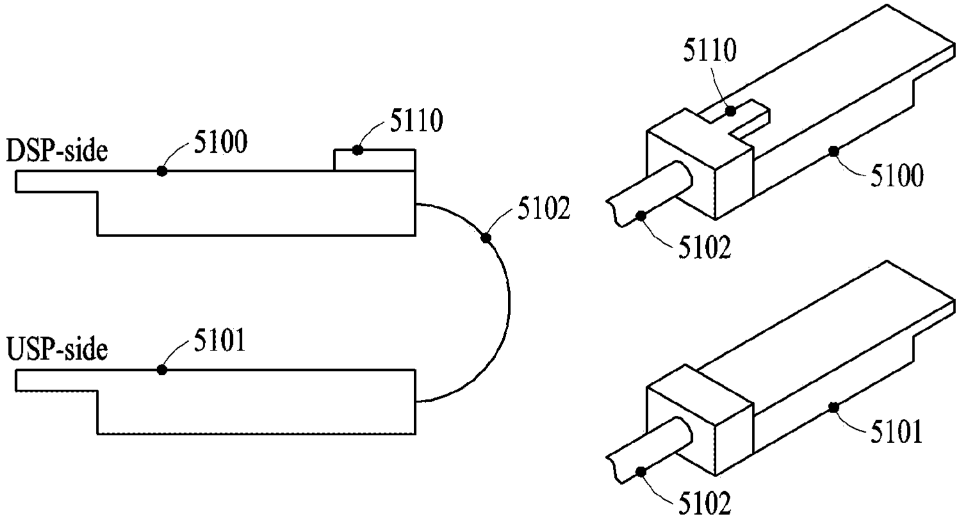

FIGS. 12A through 12C are diagrams illustrating an inter-port physical connection according to an embodiment.

According to an embodiment, for each port of a PBR switch, either upstream (host direction) or downstream (device direction) may be necessarily set in advance. This is because there is a difference between an operation performed by a USP and an operation performed by a DSP in a PCIe link training process, and when connecting a USP and a USP or a DSP and a DSP, the connection may not be established. Therefore, before connecting hosts, devices, HBR switches, PBR switches, and GFDs to a PBR switch, a direction of each port of the PBR switch may need to be set in advance.

A port-to-port connection (e.g., a connection between a DSP and a USP and a connection between an FP and an FP) may be a connection established as receptacles on two printed circuit boards (PCBs) are connected via a connector cable as a medium or a connection established as switch chips on a single PCB are connected via copper wires on the PCB.

The following describes a hardware architecture for a physical connection between a receptacle and a connector. In this case, setting the shapes of the connector and the receptacle differently may provide directionality to each port.

FIG. 12A shows example shapes of a receptacle 1201 and a connector 1202. In this case, connectors may be connected respectively to corresponding receptacles. A connector cable may be provided in a shape having a connector attached to each of both ends. The connector cable may serve as a medium for connecting receptacles. The receptacles may each correspond to a port. The connector cable may serve as a medium for connecting ports.

The cable and the connector used herein may be based on the quad small form-factor pluggable (QSFP) standard (e.g., a cable standard used for network connectivity such as Ethernet, Fiber-channel, and InfiniBand).

Referring to FIG. 12B, a receptacle may be implemented in three different shapes (e.g., 5000, 5001, and 5002). Referring to FIG. 12C, a connector cable 5102 may include a connector 5100 and a connector 5101 (e.g., at both ends).

The receptacles 5000, 5001, and 5002 may be implemented exclusively for FPs of a PBR switch. An FP may correspond to (e.g., be included in or connected to) any of the receptacles 5000, 5001, and 5002.

For example, the receptacle 5000 may be connected to the connector 5100 (e.g., a DSP-side connector 5100). The receptacle 5001 may be connected to the connector 5101 (e.g., a USP-side connector 5101). The receptacle 5002 may be connected to the DSP-side connector 5100 or the USP-side connector 5101.

Unlike the receptacle 5001, the receptacle 5000 may include a hole 5010. The hole 5010 may receive a protrusion 5110 of the DSP-side connector 5100. The hole 5010 and the protrusion 5110 may allow a receptacle and a connector that forms a pair to be desirably connected.

Because the receptacle 5002 may be connected to two types of connectors, it may be necessary to identify a type of a connected connector. The receptacle 5002 may include a trigger 5021, and the trigger 5021 may contact the protrusion 5110 of the DSP-side connector 5100. By the contact, the receptacle 5002 may identify the type of the connected connector.

The foregoing description assumes that crosslinking is not supported (e.g., assuming a connection between a DSP and a USP). However, it should be noted that, when crosslinking discussed in the CXL 3.0 protocol is supported, a port-to-port connection (or an inter-port connection) is not limited to a DSP-to-USP connection but may support a DSP-to-DSP connection and a USP-to-USP connection.

The example embodiments described herein may be implemented using hardware components, software components and/or combinations thereof. A processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as, parallel processors.

The software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape: optical media such as CD-ROM discs, DVDs, and/or Blue-ray discs: magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described examples, or vice versa.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A compute express link (CXL) fabric that connects at least one host server and a plurality of devices to form a single CXL network, the CXL fabric comprising:

at least one port-based routing (PBR) switch configured to be connected to the at least one host server, at least one of the plurality of devices, or another PBR switch to implement the CXL network; and a fabric manager configured to manage the at least one PBR switch, wherein the at least one PBR switch is configured to receive information about devices connected to each port, wherein the at least one PBR switch is configured to:

discriminate a port of a CXL 2.0 host and a downstream port of a hierarchy-based routing (HBR) switch, based on modified TS (training sequence) 1/TS2 ordered sets transmitted and received in a peripheral component interconnect-express (PCIe) link-based alternate protocol negotiation (APN) process with a neighboring port.

2. A compute express link (CXL) fabric that connects at least one host server and a plurality of devices to form a single CXL network, the CXL fabric comprising:

at least one port-based routing (PBR) switch configured to be connected to the at least one host server, at least one of the plurality of devices, or another PBR switch to implement the CXL network; and a fabric manager configured to manage the at least one PBR switch, wherein the at least one PBR switch is configured to receive information about devices connected to each port, wherein the fabric manager is configured to determine a topology of the CXL network based on information about the devices, wherein the at least one PBR switch is configured to discriminate a PBR switch and a global fabric attached memory (G-FAM) device (GFD) based on a vendor-defined message (VDM).

3. A compute express link (CXL) fabric that connects at least one host server and a plurality of devices to form a single CXL network, the CXL fabric comprising:

at least one port-based routing (PBR) switch configured to be connected to the at least one host server, at least one of the plurality of devices, or another PBR switch to implement the CXL network; and a fabric manager configured to manage the at least one PBR switch, wherein the at least one PBR switch is configured to receive information about devices connected to each port, wherein the fabric manager is configured to determine a topology of the CXL network based on information about the devices, wherein the fabric manager is configured to:

assign PBR identifiers (IDs) for PBR flit routing to the upstream port and the downstream port of the at least one PBR switch; and generate connectivity based on the PBR IDs to determine the topology of the CXL network.

4. The CXL fabric of claim 3, wherein the connectivity is represented by an adjacency matrix that treats a PBR switch as a node and represents the connectivity between the PBR switches.

5. A compute express link (CXL) fabric that connects at least one host server and a plurality of devices to form a single CXL network, the CXL fabric comprising:

at least one port-based routing (PBR) switch configured to be connected to the at least one host server, at least one of the plurality of devices, or another PBR switch to implement the CXL network; and a fabric manager configured to manage the at least one PBR switch, wherein the at least one PBR switch is configured to store metadata for identifying the at least one PBR switch as at least some virtual switch in response to a device enumeration process of the host server.

6. The CXL fabric of claim 5, wherein the virtual switch corresponds to one host server, and is configured to directly connect the host server and at least one device assigned to the host server.

7. A compute express link (CXL) fabric that connects at least one host server and a plurality of devices to form a single CXL network, the CXL fabric comprising:

at least one port-based routing (PBR) switch configured to be connected to the at least one host server, at least one of the plurality of devices, or another PBR switch to implement the CXL network; and a fabric manager configured to manage the at least one PBR switch, wherein the at least one PBR switch is configured to perform a conversion between a hierarchy-based routing (HBR) message and a PBR message based on prestored metadata.

8. The CXL fabric of claim 7, wherein the conversion between the HBR message and the PBR message is performed on ports comprised in the PBR switch, wherein a port connected on a message generation side is configured to perform a message format conversion by including a destination PBR ID (DPID) and a source PBR ID (SPID) in an incoming message into the port, and a port connected on a message end side is configured to perform a message format conversion by excluding the DPID and the SPID from an incoming message into the port.

9. The CXL fabric of claim 8, wherein the SPID comprises a PBR ID of the port connected on the message generation side or an ID value comprised in the incoming message, and the DPID comprises a PBR ID of the port connected on the message end side.

10. A port-based routing (PBR) switch, comprising:

a routing table configured to store routing information associated with routing paths in a compute express link (CXL) network;

two or more ports configured to function as an upstream port, a downstream port, or a fabric port;

a crossbar switch configured to set a connection path (crossbar) between the two or more ports based on the routing information; and a controller configured to perform monitoring and setting changes on the routing table, the two or more ports, and the crossbar switch, wherein each of the two or more ports comprises:

a multiplexer configured to determine a transmission path within a port for an incoming message into the port;

a format conversion module configured to convert a format of the incoming message; and an edge port controller configured to perform initialization and setting on an edge port.

11. A port-based routing (PBR) switch, comprising:

a routing table configured to store routing information associated with routing paths in a compute express link (CXL) network;

two or more ports configured to function as an upstream port, a downstream port, or a fabric port;

a crossbar switch configured to set a connection path (crossbar) between the two or more ports based on the routing information; and a controller configured to perform monitoring and setting changes on the routing table, the two or more ports, and the crossbar switch, wherein each of the two or more ports is configured to transmit only a PBR message to the crossbar switch regardless of a format of an incoming message into a port.

12. A compute express link (CXL) switch, comprising:

a port;

a snoop filter connected to the port and configured to perform cache coherency management between host servers sharing a specific device; and a static random-access memory (SRAM) configured to store states and owner information of cache line data used by the snoop filter for the cache coherency management;

wherein, in response to the CXL switch being a port-based routing (PBR) switch, a size of the owner information is calculated based on the a number of all ports comprised in the PBR switch, and in response to the CXL switch being a hierarchy-based routing (HBR) switch, the size of the owner information is calculated based on the a number of upstream ports comprised in the HBR switch.

13. The CXL switch of claim 12, wherein a size of the owner information is calculated based on a number of ports, not on a number of host servers.

14. The CXL switch of claim 12, wherein the snoop filter is configured to:

perform the cache coherency management between the host servers, based on a source PBR identifier (ID) (SPID), a destination PBR ID (DPID), or a logical device ID (LD-ID) comprised in a message reaching itself.

15. The CXL switch of claim 12, wherein a set of CXL switches constitutes a back-invalidation-based cache-coherent network, wherein only CXL switches that do not have the same port used when transmitting a snoop request to a host server among the host servers participate in the cache coherency management between the host servers.

16. The CXL switch of claim 12, wherein a number of cache line data stored in the SRAM is calculated based on the number of host servers for which the CXL switch manages cache coherency and a total sum of remaining capacities of all SRAMs comprised in network, the all SRAMs including the SRAM.

17. The CXL switch of claim 12, wherein, of the port, an upstream port comprises:

a protocol conversion module configured to perform a protocol conversion based on a mapping table between a host-managed device memory-D (HDM device coherent, HDM-D) and a host-managed device memory-DB (HDM device coherent using back-invalidation, HDM-DB), for cache coherency management of host servers that do not support a back-invalidation operation.

* * * * *